US012710883B2

(12) United States Patent
Seo et al.

(10) Patent No.: US 12,710,883 B2
(45) Date of Patent: Aug. 18, 2026

(54) STORAGE DEVICE FOR REDUCING RELIABILITY DEGRADATION OF OS DATA THROUGH STAGE CHANGE BEFORE SMT PROCESS AND METHOD FOR OPERATING THE SAME

(71) Applicant: SAMSUNG ELECTRONICS CO., LTD., Suwon-si (KR)

(72) Inventors: Jun-Ho Seo, Suwon-si (KR); Seongyong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/224,819

(22) Filed: Jul. 21, 2023

(65) Prior Publication Data

US 2024/0176502 A1 May 30, 2024

(30) Foreign Application Priority Data

Nov. 30, 2022 (KR) ........................ 10-2022-0163679

(51) Int. Cl.
*G06F 3/06* (2006.01)

(52) U.S. Cl.
CPC .......... *G06F 3/0619* (2013.01); *G06F 3/0634* (2013.01); *G06F 3/0647* (2013.01); *G06F 3/0679* (2013.01)

(58) Field of Classification Search
CPC .... G06F 3/0619; G06F 3/0634; G06F 3/0647; G06F 3/0679; G06F 3/0658; G11C 7/04; G11C 16/08; G11C 11/5628; G11C 16/10
See application file for complete search history.

(56) References Cited

U.S. PATENT DOCUMENTS

| | | | | |
|---|---|---|---|---|
| 8,429,334 | B2 | 4/2013 | Ou | |
| 8,700,974 | B2 | 4/2014 | Chung et al. | |
| 8,788,741 | B2 | 7/2014 | Kwon et al. | |
| 8,804,415 | B2 * | 8/2014 | Wood | H01L 29/792 365/185.24 |
| 9,030,870 | B2 | 5/2015 | Moschiano et al. | |
| 9,671,969 | B2 | 6/2017 | Shim et al. | |
| 10,741,224 | B2 | 8/2020 | Stichka et al. | |
| 11,043,266 | B1 | 6/2021 | Tagar et al. | |
| 11,049,547 | B1 * | 6/2021 | Lee | G11C 16/28 |
| 11,296,729 | B2 | 4/2022 | Kale et al. | |

(Continued)

FOREIGN PATENT DOCUMENTS

| | | |
|---|---|---|
| KR | 10-1811298 B1 | 12/2017 |
| KR | 10-2309841 B1 | 10/2021 |

OTHER PUBLICATIONS

Communication issued Mar. 5, 2024 by the European Patent Office in EP App No. 23192873.0.

*Primary Examiner* — Nanci N Wong
(74) *Attorney, Agent, or Firm* — Sughrue Mion, PLLC

(57) ABSTRACT

A method of operating a storage device for programming data into a flash memory before a surface mount technology (SMT) process is provided. The method includes: comparing program states of first memory cells connected to a first word line with program states of second memory cells connected to a second word line; changing the program states of the second memory cells according to a result of the comparing; and multi-bit programming the data and changed state information into the second memory cells.

17 Claims, 17 Drawing Sheets

(56) References Cited

U.S. PATENT DOCUMENTS

| | | | | |
|---|---|---|---|---|
| 11,322,208 | B2 | 5/2022 | Seo et al. | |
| 2006/0126391 | A1* | 6/2006 | Kim | G11C 16/3436 365/185.03 |
| 2015/0294723 | A1* | 10/2015 | Choi | G11C 16/26 365/185.11 |
| 2017/0060463 | A1* | 3/2017 | Shim | G11C 16/3454 |
| 2017/0110185 | A1* | 4/2017 | Hahn | G11C 11/5642 |
| 2022/0172775 | A1* | 6/2022 | Park | G11C 16/10 |
| 2023/0402113 | A1* | 12/2023 | Miwa | G11C 11/5628 |
| 2024/0152280 | A1* | 5/2024 | Ahn | G06F 3/0619 |

* cited by examiner

100

STORAGE DEVICE (1000)

Flash Memory (1100)

Memory Cell Array (1110)

BLKn

BLK2

BLK1

Peripheral Circuit (1115)

1202

Memory Controller (1200)

Processor (1210)

RAM (1220)

ROM (1230)

ECC (1240)

1201

HOST (1500)

BLK1

BL1 BL2 BLz

STR11 STR21 STR81 STR12 STR82 STR1z STR8z

SST MC8 MC6 MC5 MC4 MC1 GST

SSL1 SSL2 SSL8

WL8 WL6 WL5 WL4 WL1

GSL1 GSL2 GSL8

CSL

BL1
STR11
SSL1
WL8
WL7
WL6
WL5
WL4
WL3
WL2
WL1
GSL1
CSL
SST
MC8
MC7
MC6
MC5
MC4
MC3
MC2
MC1
GST
T2B
WL(1)
WL(2)
WL(3)
WL(4)
WL(5)
WL(6)
WL(7)
WL(8)
WL(3) [programmed]
WL(4) [to program]
Bit-encoding
BL1 BL2 BL3 BL4 BL5 BL6 BL7 BL8
E0 P1 P2 P3 P4 P5 P6 P7
P7 P6 P5 P4 P3 P2 P1 E0
E0 or P1 or P2
P1 or P2 or P3
P6 or P7 or P5 or P4
P7 or P6 or P5

Erased state of WL(n)
# of cells
Vth
E0
Program disturbance of WL(n) data
Vfy1
E0
P1
P2
P3
P4
P5
P6
P7
S380: Reprogram data of WL(n)
Decrease ΔV of ISPP
Vfy1'

200

STORAGE DEVICE (2000)

Flash Memory (2100)

Memory Cell Array (2110)

BLKn

BLK2

BLK1

Peripheral Circuit (2115)

2202

Memory Controller (2200)

State Index Engine (2270)

State Index Encoder (2271)

State Index Decoder (2272)

2201

HOST (2500)

4000

4200

Flash Memory (4101)

Flash Memory (4102)

Flash Memory (4103)

Flash Memory (4104)

CH1

CH2

Flash Interface (4202)

Work Memory (4220)

Control Unit (4210)

Buffer Interface (4203)

Buffer Memory (1300)

HOST Interface (4201)

HOST (1500)

STORAGE DEVICE FOR REDUCING RELIABILITY DEGRADATION OF OS DATA THROUGH STAGE CHANGE BEFORE SMT PROCESS AND METHOD FOR OPERATING THE SAME

CROSS-REFERENCE TO RELATED APPLICATION

This application claims priority to Korean Patent Application No. 10-2022-0163679 filed on Nov. 30, 2022, in the Korean Intellectual Property Office, the disclosure of which is incorporated by reference herein in its entirety.

BACKGROUND

Embodiments relate to a semiconductor memory device, and more particularly, relate to a flash memory that reduces reliability degradation of operating system (OS) data due to a surface mount technology (SMT) process.

A semiconductor memory may be mainly classified as a volatile memory or a non-volatile memory. Read and write speeds of the volatile memory (e.g., a dynamic random-access memory (DRAM) or a static random-access memory (SRAM)) are fast, but the data stored in the volatile memory disappear when a power is turned off. In contrast, the non-volatile memory may retain data even when the power is turned off.

A representative example of the non-volatile memory is a flash memory. The flash memory may store multi-bit data of two or more bits in one memory cell. The flash memory that stores the multi-bit data may have one erase state and a plurality of program states depending on threshold voltage distributions.

The flash memory is widely used as a storage device for electronic devices such as computers, smart phones, and digital cameras. The storage device may store OS data may be stored before the storage device is mounted on a printed circuit board.

In the process of mounting on the printed circuit board, SMT or infrared reflow (IR Reflow) may be used. Reliability of OS data stored in the flash memory may be deteriorated through this process. A threshold voltage distribution of memory cells of the flash memory may change due to a high-temperature SMT process, and reliability of OS data stored in the flash memory may deteriorate.

SUMMARY

One or more embodiments provide a storage device that reduces reliability degradation of operating system (OS) data through a state change before a surface mount technology (SMT) process.

According to an aspect of an embodiment, a method of operating a storage device for programming OS data into a flash memory before an SMT process, includes: comparing program states of first memory cells connected to a first word line with program states of second memory cells connected to a second word line; changing the program states of the second memory cells according to a result of the comparing; and multi-bit programming the data and changed state information into the second memory cells.

According to an aspect of an embodiment, a method of operating a storage device for programming OS data into a flash memory before an SMT process, includes: programming first memory cells connected to a first word line; reading first program states of the first memory cells; checking second program states of second memory cells connected to a second word line; comparing the first program states with the second program states; changing the second program states according to a result of the comparing; and multi-bit programming the data and changed state information into the second memory cells.

According to an aspect of an embodiment, a storage device includes: a flash memory including first memory cells connected to a first word line and second memory cells connected to a second word line; and a memory controller configured to compare program states of the first memory cells with program states of the second memory cells, change the program states of the second memory cells according to a comparison result, and multi-bit program data and changed state information into the second memory cells.

BRIEF DESCRIPTION OF DRAWINGS

The above and other objects and features will be more clearly understood from the following description, taken in conjunction with the accompanying drawings.

DETAILED DESCRIPTION

Hereinafter, embodiments are described in conjunction with the accompanying drawings. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
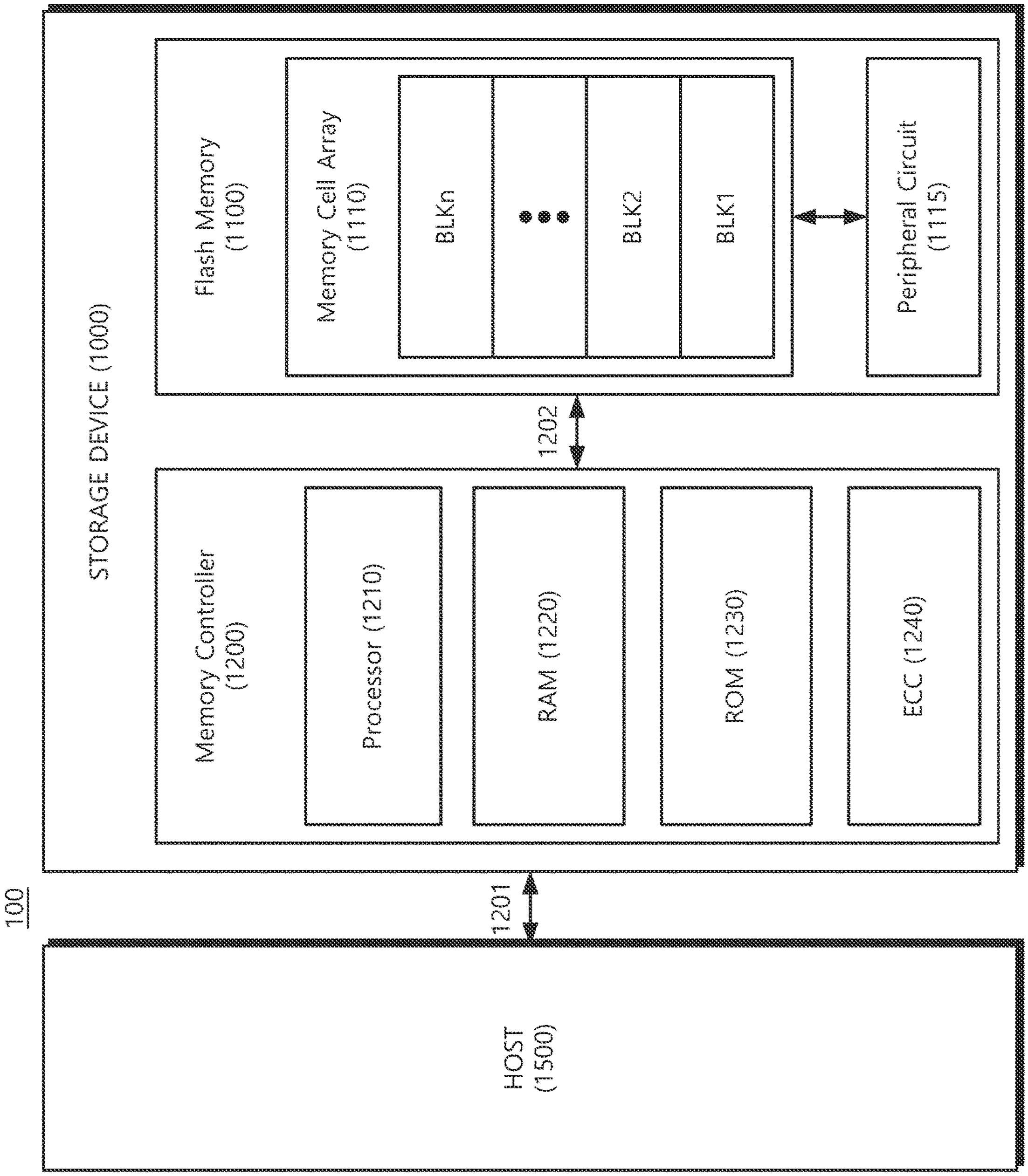
FIG. 1 is a block diagram illustrating a memory system according to an embodiment.

FIG. 1 is a block diagram illustrating a memory system according to an embodiment. Referring to FIG. 1, a memory system 100 includes a storage device 1000 and a host 1500. The storage device 1000 may be connected to the host 1500 through a host interface 1201.

The storage device 1000 may include a non-volatile memory. For example, the storage device 1000 may be a flash storage device based on the flash memory 1100. The flash storage device may be implemented as an solid state drive (SSD), Universal Flash Storage (UFS), memory card, or the like. The storage device 1000 may include a flash memory 1100 and a memory controller 1200.

The flash memory 1100 may be connected to the memory controller 1200 through a flash interface 1202. The flash memory 1100 may include a memory cell array 1110 and a peripheral circuit 1115. The memory cell array 1110 may include a plurality of memory blocks BLK1 to BLKn. Each memory block may have a vertical 3D structure. Each memory block may include a plurality of memory cells. Multi-bit data may be stored in each memory cell.

The memory cell array 1110 may be located next to or above the peripheral circuit 1115 in terms of the design layout structure. A structure in which the memory cell array 1110 is positioned over the peripheral circuit 1115 is referred to as a cell on peripheral (COP) structure. The memory cell array 1110 and the peripheral circuit 1115 may be manufactured as separate chips. An upper chip including the memory cell array 1110 and a lower chip including the peripheral circuit 1115 may be connected to each other by a bonding method. Such a structure is called a C2C (chip to chip) structure.

The peripheral circuit 1115 may receive external power from the memory controller 1200 and generate internal power of various levels. The peripheral circuit 1115 may receive commands, addresses, and data from the memory controller 1200 and store data in the memory cell array 1110 according to control signals. Also, the peripheral circuit 1115 may read data stored in the memory cell array 1110 and provide the data to the memory controller 1200.

Referring to FIG. 1, the memory controller 1200 may include a processor 1210, a random access memory (RAM) 1220, a read only memory (ROM) 1230, and an error correction code (ECC) circuit 1240.

The processor 1210 may control overall operations of the memory controller 1200. The processor 1210 may receive a set feature command from the host 1500 and set a surface mount technology (SMT) operation mode. The processor 1210 may perform a ROM burst operation before a SMT process and a ROM burst migration operation after the SMT process according to the SMT operation mode.

The RAM 1220 may be cache memory (e.g., static random-access memory (SRAM)), buffer memory (e.g., dynamic random-access memory (DRAM)), or driving memory. The RAM 1220 may drive software or firmware for performing the SMT operation mode under the control of the processor 1210.

The ROM 1230 may store various information required for the processor 1210 to operate in the form of firmware. For example, the ROM 1230 may store SMT operation mode information. The ROM 1230 may store bit values for performing the ROM burst mode 1231 and the ROM burst migration mode 1232. The ROM burst mode 1231 is an operation mode for downloading operating system (OS) data before the SMT process. The ROM burst migration mode 1232 is an operation mode for data migration after the SMT process.

The ECC circuit 1240 may generate an error correction code for correcting a fail bit or an error bit of data received from the flash memory 1100. The ECC circuit 1240 may generate data to which parity bits are added by performing error correction encoding on data provided to the flash memory 1100. Parity bits may be stored in the flash memory 1100.

The host 1500 may be a device for programming OS data in the storage device 1000. The host 1500 may provide OS data to the storage device 1000 before the SMT process. The host 1500 may set the storage device 1000 to recognize OS data and operate according to the SMT operation mode.

Figure 2:
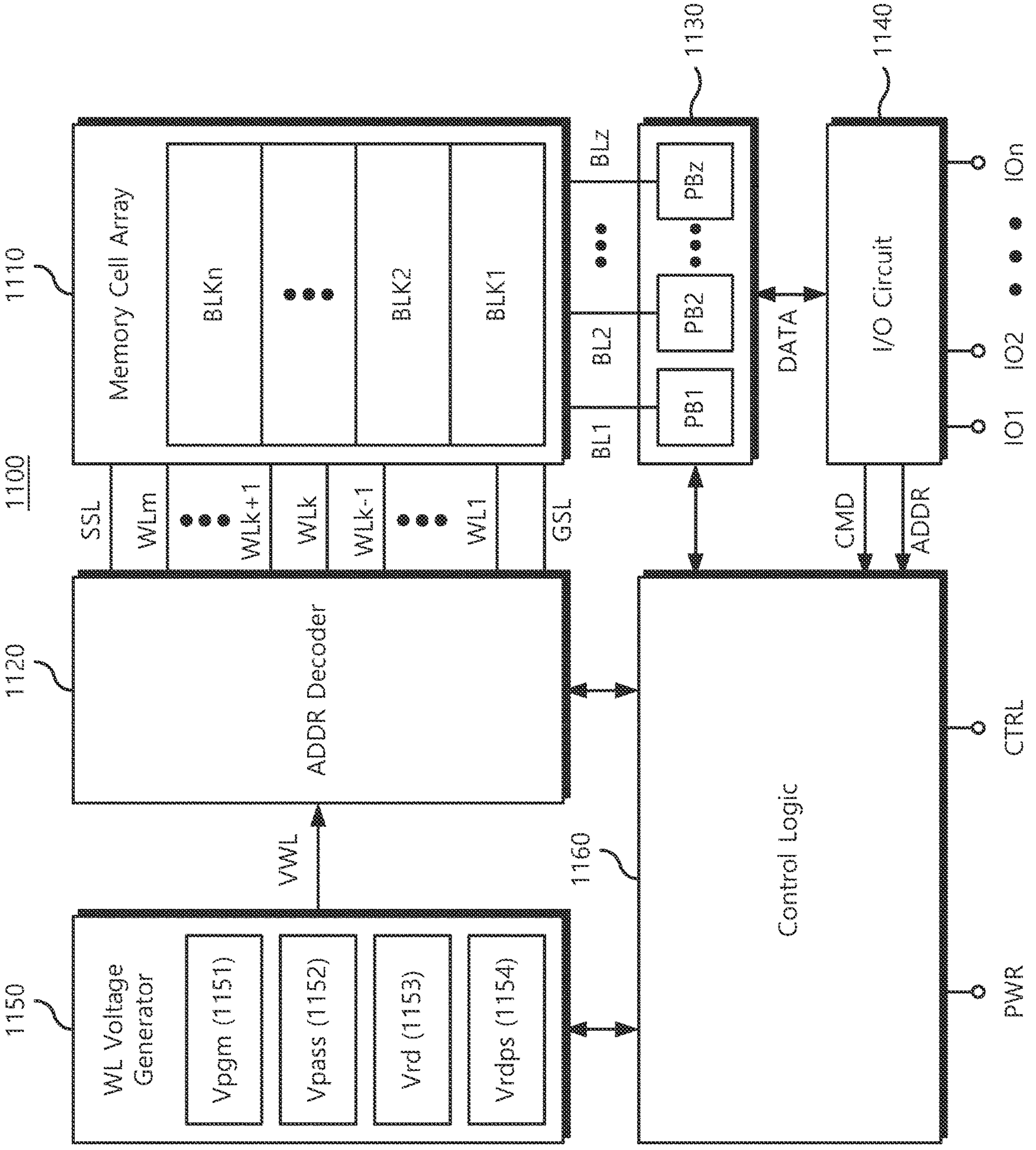
FIG. 2 is a block diagram illustrating an example of the flash memory illustrated in FIG. 1.

FIG. 2 is a block diagram illustrating an example of the flash memory illustrated in FIG. 1. Referring to FIG. 2, a flash memory 1100 includes a memory cell array 1110, an address decoder 1120, a page buffer circuit 1130, a data input/output circuit 1140, a word line voltage generator 1150, and a control logic 1160.

The memory cell array 1110 may include a plurality of memory blocks BLK1 to BLKn. Each memory block may be composed of a plurality of pages. Each page may include a plurality of memory cells. Multi-bit data may be stored in each memory cell. Each memory block is an erase unit, and each page may be a read or write unit.

The memory cell array 1110 may be formed in a direction perpendicular to an upper surface of the substrate. A gate electrode layer and an insulation layer may be alternately and repeatedly deposited on the substrate. Each memory block (e.g., BLK1) may be connected to a string selection line SSL, a plurality of word lines WL1 to WLm, and a ground selection line GSL.

The address decoder 1120 may be connected to the memory cell array 1110 through selection lines SSL and GSL and word lines WL1 to WLm. The address decoder 1120 may select a word line during a program or read operation. The address decoder 1120 may receive the word line voltage VWL from the word line voltage generator 1150 and provide a program voltage or read voltage to the selected word line.

The page buffer circuit 1130 may be connected to the memory cell array 1110 through bit lines BL1 to BLz. The page buffer circuit 1130 may temporarily store data to be stored in the memory cell array 1110 or data read from the memory cell array 1110. The page buffer circuit 1130 may include page buffers PB1 to PBz connected to respective bit lines. Each page buffer may include a plurality of latches to store or read multi-bit data.

The input/output circuit 1140 may be internally connected to the page buffer circuit 1130 through data lines and externally connected to a memory controller (refer to FIG. 1, 1200) through the input/output lines IO1 to IOn. The input/output circuit 1140 may receive program data from the memory controller 1200 during a program operation. Also, the input/output circuit 1140 may provide data read from the memory cell array 1110 to the memory controller 1200 during a read operation.

The word line voltage generator 1150 may receive internal power from the control logic 1160 and generate a word line voltage VWL required to read or write data. The word line voltage VWL may be provided to a selected word line sWL or an unselected word line uWL through the address decoder 1120.

The word line voltage generator 1150 may include a program voltage generator 1151 and a pass voltage generator 1152. The program voltage generator 1151 may generate a program voltage Vpgm provided to the selected word line sWL during a program operation. The pass voltage generator 1152 may generate a pass voltage Vpass provided to the selected word line sWL and the unselected word lines uWL.

The word line voltage generator 1150 may include a read voltage generator 1153 and a read pass voltage generator 1154. The read voltage generator 1153 may generate the select read voltage Vrd provided to the select word line sWL during a read operation. The read pass voltage generator 1154 may generate a read pass voltage Vrdps provided to the unselected word lines uWL. The read pass voltage Vrdps may be a voltage sufficient to turn on memory cells connected to the unselected word lines uWL during a read operation.

The control logic 1160 may perform read, program, and erase operations of the flash memory 1100 using the command CMD, address ADDR, and control signal CTRL provided from the memory controller 1200. The address ADDR may include a block selection address for selecting one memory block. Also, the address ADDR may include a row address for selecting one or more word lines and a column address for selecting one or more bit lines.

Figure 3:
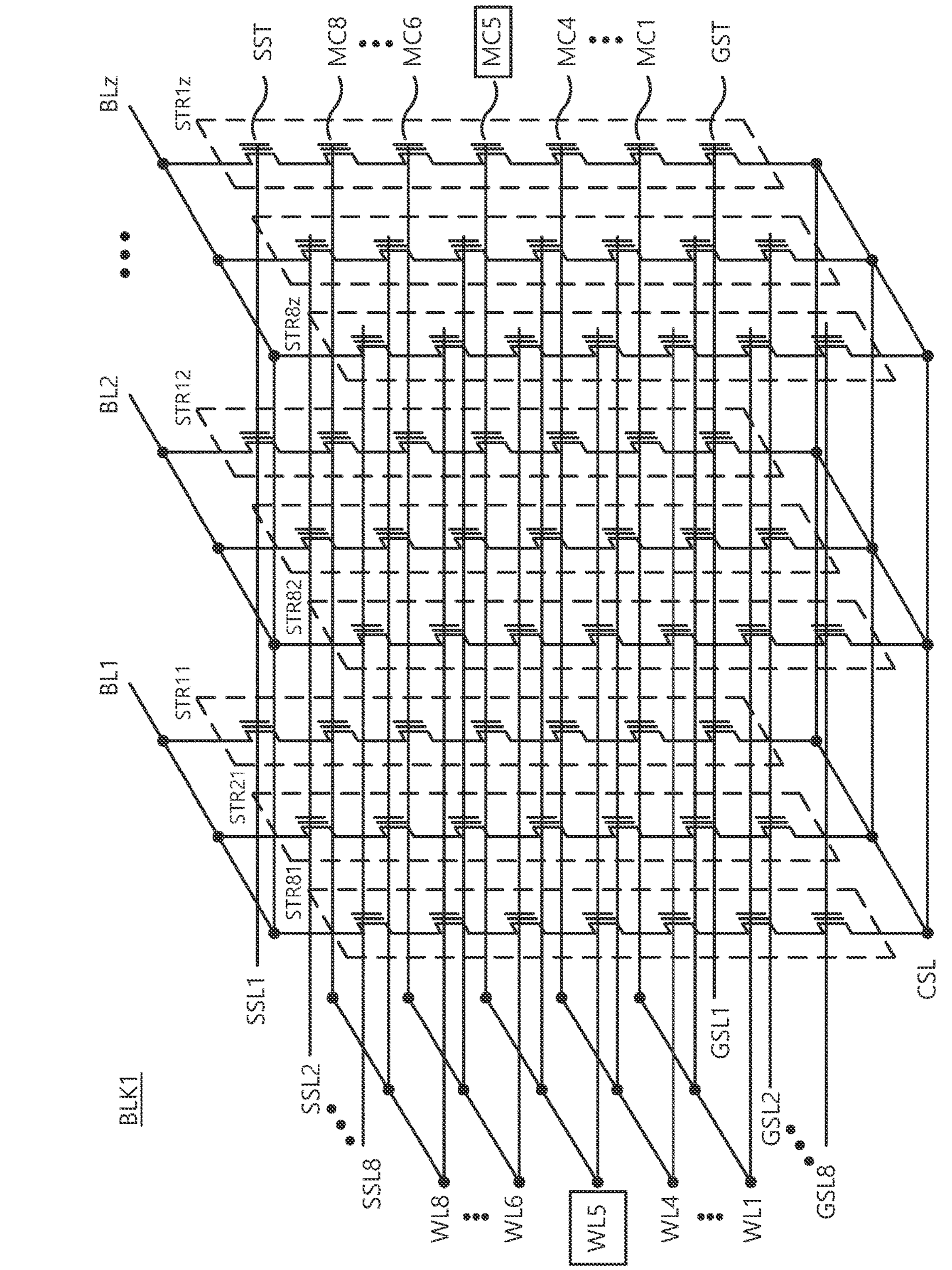
FIG. 3 is a circuit diagram illustrating an example of a memory block BLK1 of the memory cell array illustrated in FIG. 2.

FIG. 3 is a circuit diagram illustrating an example of a memory block BLK1 of the memory cell array illustrated in FIG. 2. Referring to FIG. 3, in the memory block BLK1, a plurality of cell strings STR11 to STR8*z* may be formed between the bit lines BL1 to BLz and a common source line CSL. Each cell string includes a string selection transistor SST, a plurality of memory cells MC1 to MC8, and a ground selection transistor GST.

The string selection transistors SST may be connected with string selection lines SSL1 to SSL8. The ground selection transistors GST may be connected with ground selection lines GSL1 to GSL8. The string selection transistors SST may be connected with the bit lines BL1 to BLz, and the ground selection transistors GST may be connected with the common source line CSL.

The first to eighth word lines WL1 to WL8 may be connected with the plurality of memory cells MC1 to MC8 in a row direction. The first to z-th bit lines BL1 to BLz may be connected with the plurality of memory cells MC1 to MC8 in a column direction. First to z-th page buffers PB1 to PBz may be connected with the first to z-th bit lines BL1 to BLz.

The first word line WL1 may be placed above the first to eighth ground selection lines GSL1 to GSL8. The first memory cells MC1 that are placed at the same height from the substrate may be connected with the first word line WL1. Likewise, the second to eighth memory cells MC2 to MC8 that are placed at the same heights from the substrate may be respectively connected with the second to eighth word lines WL2 to WL8.

Figure 4:
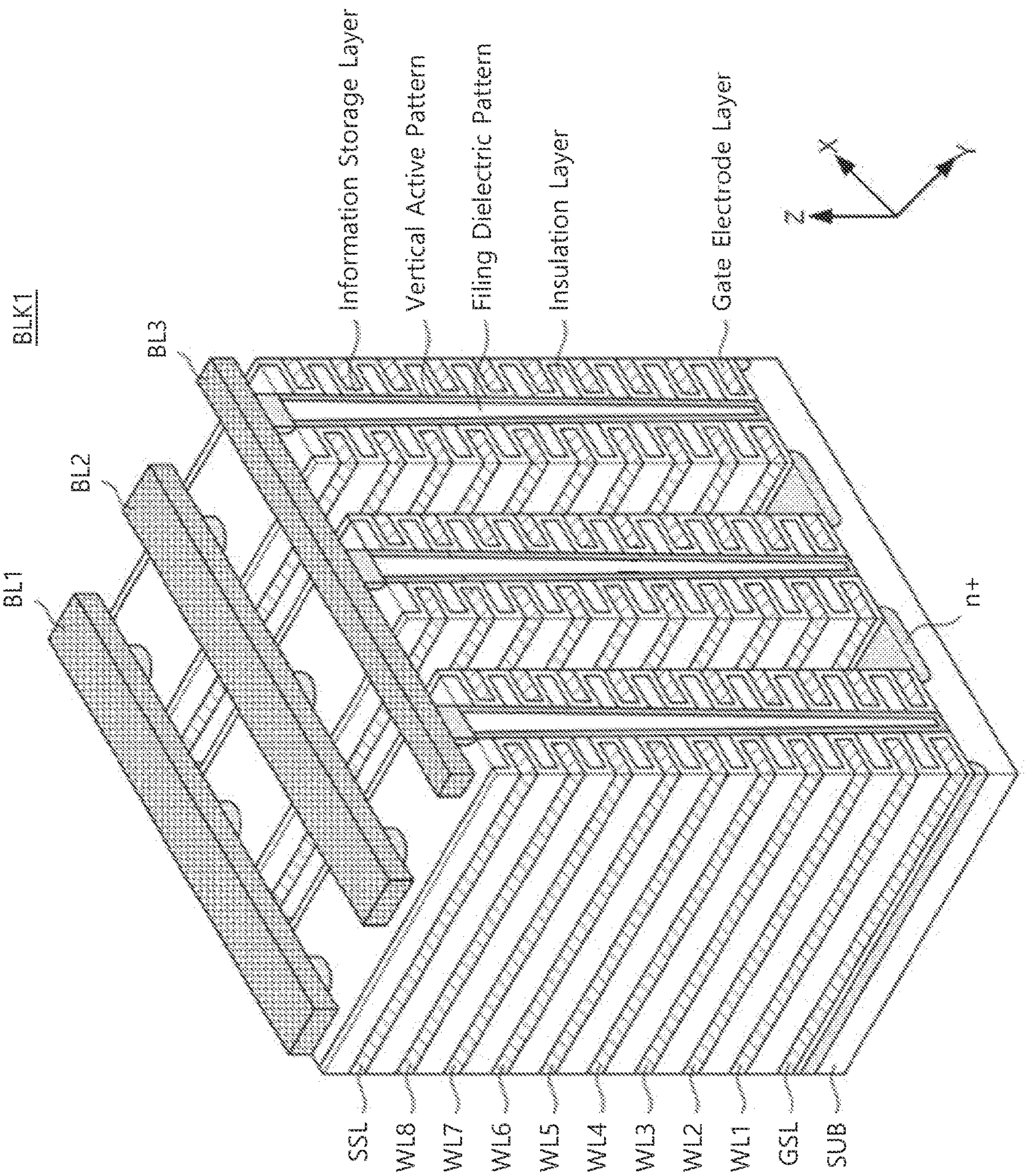
FIG. 4 is a perspective view illustrating an example of a 3D structure of a memory block BLK1 of the memory cell array illustrated in FIG. 2.

FIG. 4 is a perspective view exemplarily illustrating a 3D structure of a memory block BLK1 of the memory cell array illustrated in FIG. 2. FIG. 4 shows a cross section cut in the Z direction in BL3. Referring to FIG. 4, the memory block BLK1 is formed in a direction perpendicular to the substrate SUB. An n+ doped region is formed on the substrate SUB. A gate electrode layer and an insulation layer are alternately deposited on the substrate SUB. An information storage layer may be formed between the gate electrode layer and the insulation layer.

When the gate electrode film and the insulating film are patterned in a vertical direction, a V-shaped pillar is formed. The pillar may be connected to the substrate SUB by penetrating the gate electrode film and the insulating film. The inside of the pillar may be made of an insulating material such as silicon oxide as a filling dielectric pattern. The outside of the pillar may be composed of a channel semiconductor with a vertical active pattern.

A gate electrode layer of the memory block BLK1 may be connected to a ground selection line GSL, a plurality of word lines WL1 to WL8, and a string selection line SSL. Also, a pillar of the memory block BLK1 may be connected to a plurality of bit lines BL1 to BL3. In FIG. 4, one memory block BLK1 is illustrated as having two select lines GSL and SSL, eight word lines WL1 to WL8, and three bit lines BL1 to BL3, but embodiments are not limited thereto, and the 3D structure may include additional or fewer bit, select and word lines.

Figure 5:
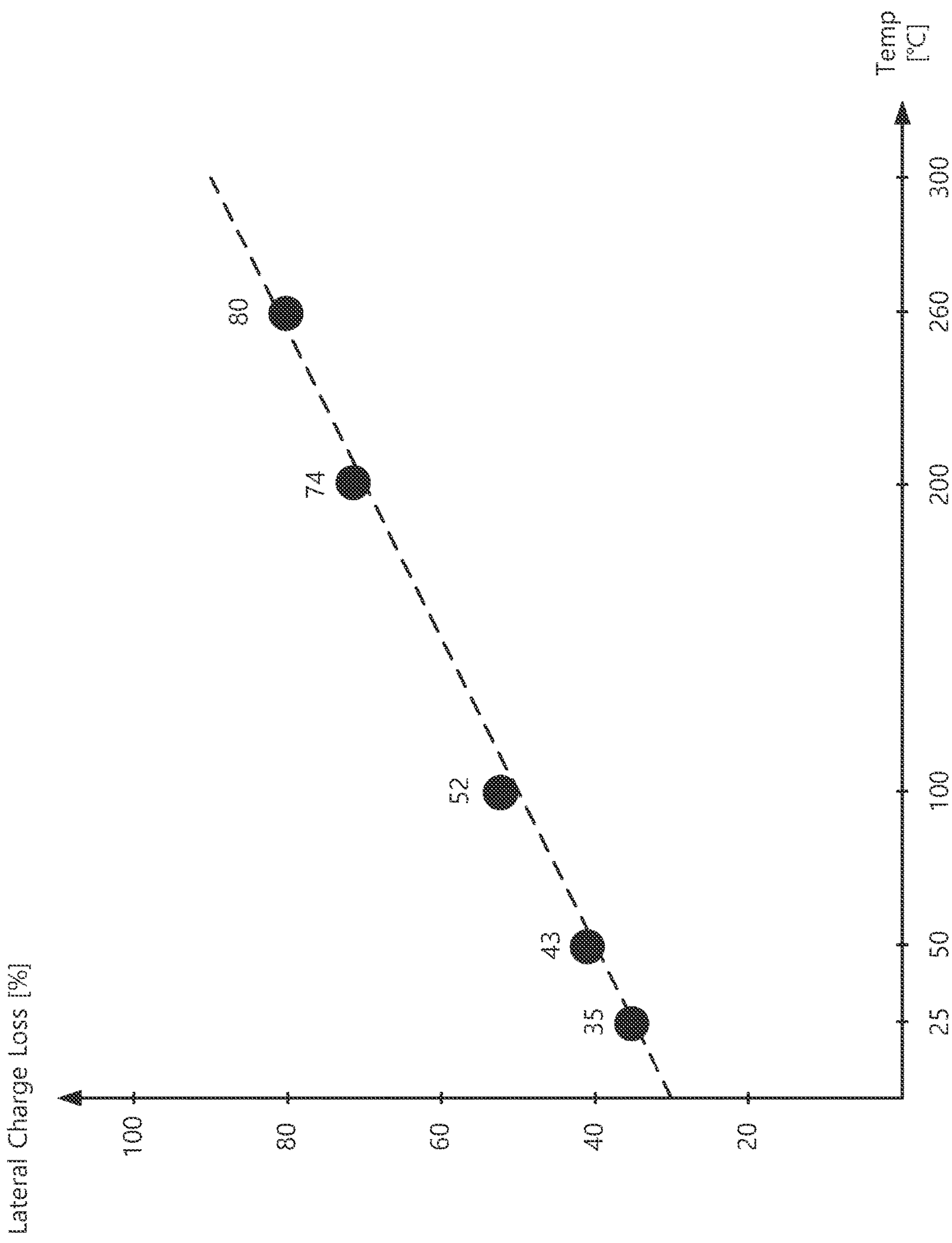
FIG. 5 is a graph illustrating experimental results of a lateral charge loss according to temperature in the memory block illustrated in FIG. 4.

FIG. 5 is a graph illustrating experimental results of a lateral charge loss according to temperature in the memory block illustrated in FIG. 4. In FIG. 5, the horizontal axis is temperature, and the vertical axis is the lateral charge loss.

The lateral charge loss refers to a phenomenon in which charges trapped in the information storage layer of FIG. 4 escape in a lateral direction (Z direction). That is, the lateral charge loss refers to a phenomenon in which charges trapped in the information storage layer of A or B shown in FIG. 4 leak in the lateral direction.

The lateral charge loss may increase with increasing temperature. Referring to FIG. 5, when the temperature is 25° C., the lateral charge loss is 35%. It may be seen that when the temperature rises to 50° C., 100° C., and 200° C., the lateral charge loss increases proportionally to 43%, 52%, and 74%, linearly. When the temperature is about 260° C., the lateral charge loss is about 80%. When the lateral charge loss increases, threshold voltage distribution of memory cells may be affected.

Figure 6:
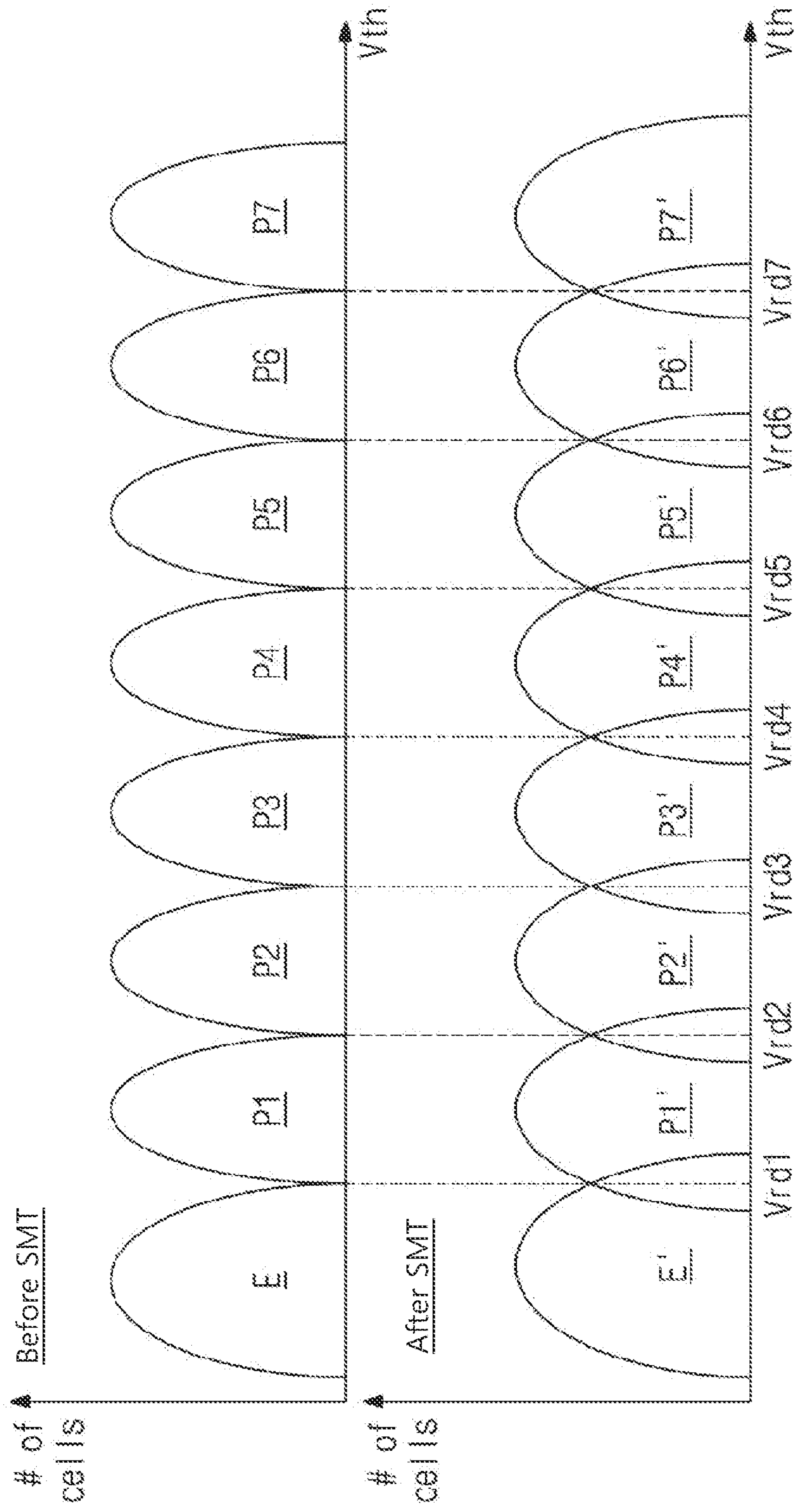
FIG. 6 is a graph illustrating distribution of threshold voltages of the memory cells illustrated in FIG. 4.

FIG. 6 is a graph illustrating distribution of threshold voltages of the memory cells illustrated in FIG. 4. In FIG. 6, the horizontal axis represents the threshold voltage Vth, and the vertical axis represents the number of memory cells. Referring to FIG. 6, in the case of a triple-level cell (TLC) memory capable of storing three bits in one memory cell, one memory cell may have one of eight threshold voltage distributions. However, due to differences in electrical characteristics between the plurality of memory cells, the threshold voltage of each of the plurality of memory cells programmed with the same data may form a threshold voltage distribution within a certain range.

In the case of TLC, threshold voltage distributions corresponding to one erase state E and seven program states P1 to P7 may be formed. As shown in FIG. 6, the upper portion indicates threshold voltage distributions before the SMT process is performed (Before SMT), and the portion indicates lower threshold voltage distributions after the SMT process is performed (After SMT). Threshold voltage distributions before the SMT process are ideally distributed. For example, the threshold voltage distributions corresponding to the respective states E, P1 to P7 may not overlap. Accordingly, the flash memory 1100 may determine the state of the memory cell using select read voltages Vrd1 to Vrd7.

After the SMT process, charges trapped in the memory cells may be released in a lateral direction due to high-temperature degradation. At this time, the threshold voltage distributions may be moved to the left or right. For example, in the case of the SMT process, memory cells experience a high-temperature environment of about 260° C., and thus the threshold voltage distributions corresponding to the erase state E' and seven program states P1' to P7' may overlap one another.

If the threshold voltage distributions overlap, error bits of a certain level or higher may occur when the read voltage is applied. For example, when the first read voltage Vrd1 is applied, the on cell means the left erase state E', and the off cell means the right first program state P1'. That is, when threshold voltage distributions overlap, a specific memory cell may be read as an off cell even though it is in an erased state E'. As the temperature of the flash memory 1100 increases, the probability of occurrence of error bits may increase.

Figure 7:
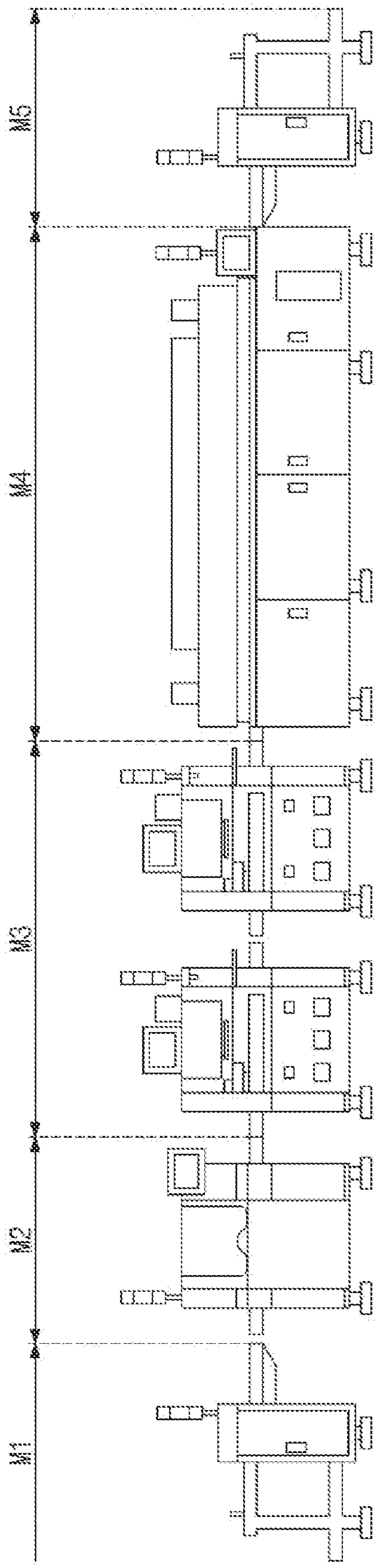
FIG. 7 is a conceptual diagram illustrating an example of an SMT process.

FIG. 7 is a conceptual diagram illustrating an example of an SMT process. Referring to FIG. 7, the SMT process may include a loading operation M1, a printing operation M2, a mounting operation M3, a bonding operation M4, and an unloading operation M5.

In the SMT process, solder paste is printed on a printed circuit board PCB, various surface mount devices SMD are mounted thereon using mounting equipment, and then passed through a reflow oven. Leads of the printed circuit board PCB and leads of surface mount devices SMD may reflow and be bonded as they pass through the reflow oven. The SMT process is a technology that produces a finished PCB by an organic combination of a plurality of equipment. Depending on the working environment, at least one SMT process line including a plurality of equipment may be provided.

The loading operation M1 may include loading the PCB into the SMT equipment area. For example, a loader is a device that automatically supplies PCB. The loader may supply PCB using a medium called a magazine.

The printing operation M2 may include applying a solder to a pattern region of PCB on which a plurality of devices are to be mounted. For example, a print inspector may apply the solder to a component mounting location on the surface of PCB loaded through the loader.

The mounting operation M3 may include mounting a plurality of devices on the solder. For example, a chip mounter may place and fix various components and chips on a land portion on PCB where the solder is applied. As an example, a plurality of chip mounters may be used to simultaneously mount various components and chips.

The bonding operation M4 may include reflowing the solder. For example, a reflow oven may heat and melt solder paste underneath components mounted on a PCB, and then fix the components onto the PCB through a curing process. As an example, the reflow oven may heat the solder at a high temperature of 260° C. for 30 seconds.

The unloading operation M5 may include unloading the PCB to which a plurality of devices are bonded to the outside of the SMT equipment area. For example, the unloader may move the PCB to which the plurality of devices are bonded out of the SMT process line. As an example, the unloader may include an inspection device that compares the image of the cured PCB with the stored reference image to determine whether the finished PCB is good or bad.

The flash memory 1100 may be degraded to a high temperature by being exposed to a high-temperature environment in the bonding operation M4. The threshold voltage of flash memory cells may change while passing through the SMT process line. As a result, the probability of occurrence of error bits in data stored in the flash memory 1100 may increase due to the SMT process. The memory system 100 according to an embodiment may reduce error bits of the flash memory 1100 and increase data reliability even when an SMT process is performed.

Figure 8:
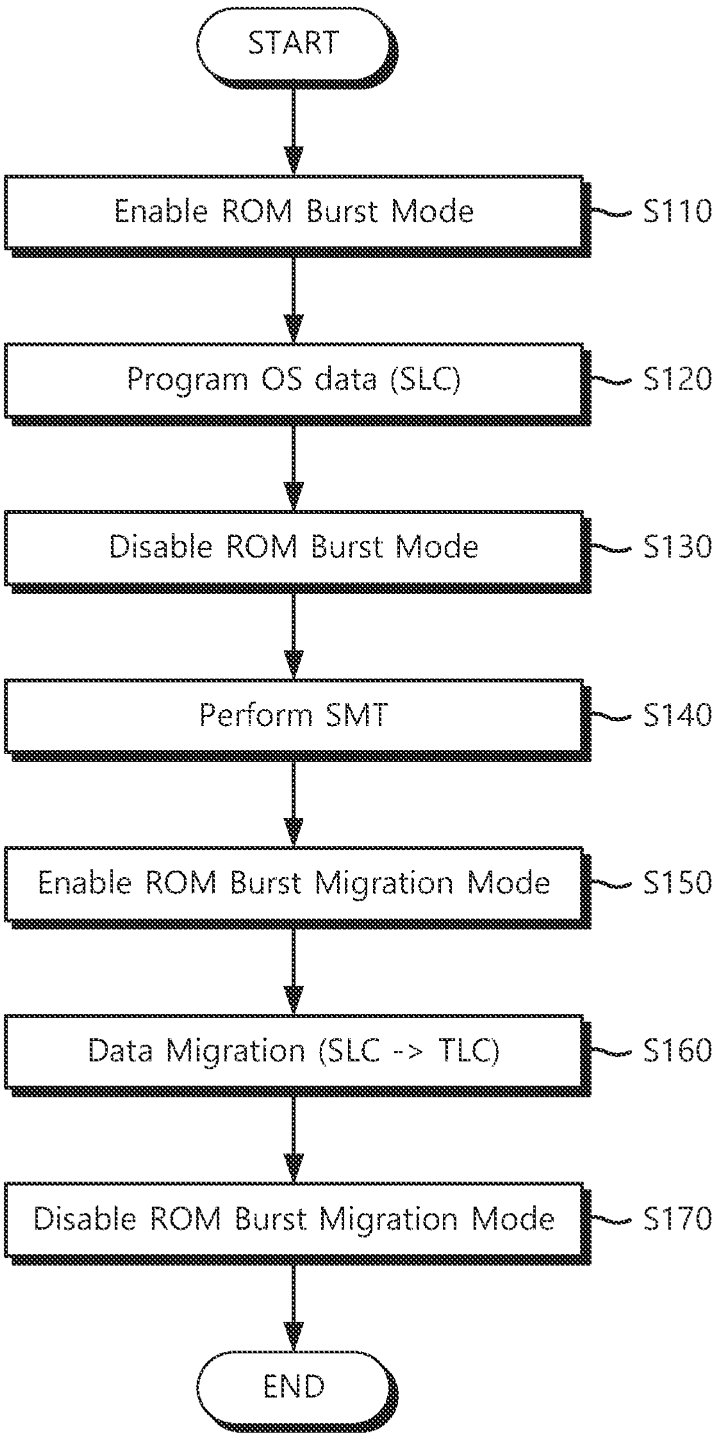
FIG. 8 is a flowchart illustrating an example of an SMT operation method.

FIG. 8 is a flowchart illustrating an example of an SMT operation method. A ROM burst mode may be enabled before the SMT process, and a ROM burst migration mode may be enabled after the SMT process.

In operation S110, the ROM burst mode may be enabled. The ROM burst mode may be enabled through a command provided from the host (refer to FIG. 1, 1500). A set feature for activating the ROM burst mode may be set in the ROM (refer to FIG. 1, 1230) of the memory controller (refer to FIG. 1, 1200).

The ROM burst mode is a program mode for storing OS data before a flash memory (refer to FIG. 1, 1100) performs an SMT process. After the ROM burst mode is enabled, the memory controller 1200 may store single-level cell (SLC) program OS data into the flash memory 1100 (S120). After programming the OS data, the memory controller 1200 may disable the ROM burst mode (S130).

After the ROM burst mode is completed, the SMT process described in FIG. 7 may be performed (S140). Because the threshold voltage of the flash memory cells may change while passing through the SMT process line, the probability of generating error bits may increase.

The memory controller 1200 may enable the ROM burst migration mode after the SMT process (S150). The ROM burst migration mode is a program mode for restoring OS data to its original state after the flash memory 1100 performs an SMT process.

After the ROM burst migration mode is enabled, the memory controller 1200 may perform a data migration operation (S160). For example, the flash memory 1100 may perform data migration of SLC programmed OS data to TLC programmed OS data. After performing the data migration operation, the memory controller 1200 may disable the ROM burst migration mode (S170).

Figure 9:
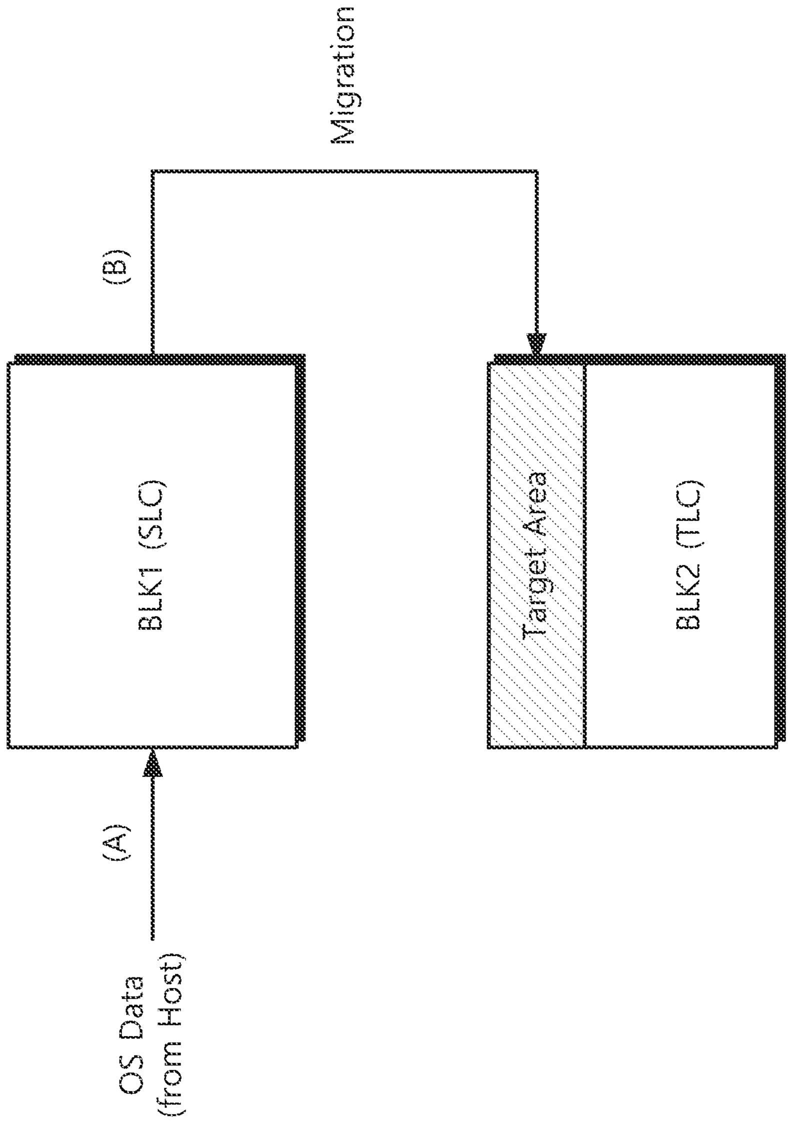
FIG. 9 is a conceptual diagram illustrating an example of the data migration operation illustrated in FIG. 8.

FIG. 9 is a conceptual diagram illustrating an example of the data migration operation illustrated in FIG. 8. Referring to FIG. 9, when OS data is provided from the host 1500, the OS data is SLC programmed into the first memory block BLK1 under the control of the memory controller 1200. This procedure is illustrated by symbol (A). OS data stored in the first memory block BLK1 will move (i.e., migrate) to a target area of the second memory block BLK2 after the SMT process. This procedure is indicated by symbol (B).

In the process of assembling the memory system 100 including the flash memory 1100, an SLC program is performed before the SMT process, and an operation of migrating from SLC to TLC is performed after the SMT process. The reason for using this method is that TLC programmed data may be more susceptible to error bits than SLC programmed data. Thus, if the TLC program is performed before the SMT process, the probability of generating error bits increases due to high-temperature deterioration of the SMT process. That is, to reduce error bits due to high-temperature deterioration of the SMT process, the OS data programmed before the SMT process performs the SLC program.

Although the SLC programmed data is more reliably stored than the TLC programmed data, the SLC programming provides a lower storage capacity than TLC programming. This is because the SLC allows for one bit per cell, whereas the TLC allows for 3 bits per cell. In this regard, if the OS data is SLC programmed before the SMT process, only about 25% of the total write capacity of the flash memory 1100 may be used compared to the TLC program. To maximize the write capacity of the flash memory 1100, it is necessary to perform a multi-bit program (e.g., TLC program) even before the SMT process. However, if the TLC program is performed before the SMT process, as described above, the probability of generating error bits due to high-temperature degradation of the SMT process may increase.

The SMT operation method according to an embodiment may perform multi-bit programming of OS data prior to the SMT process. For example, embodiments may increase the write capacity by performing a TLC program on OS data before the SMT process. In addition, embodiments may reduce the probability of generating error bits due to high-temperature deterioration in the SMT process.

Figure 10:
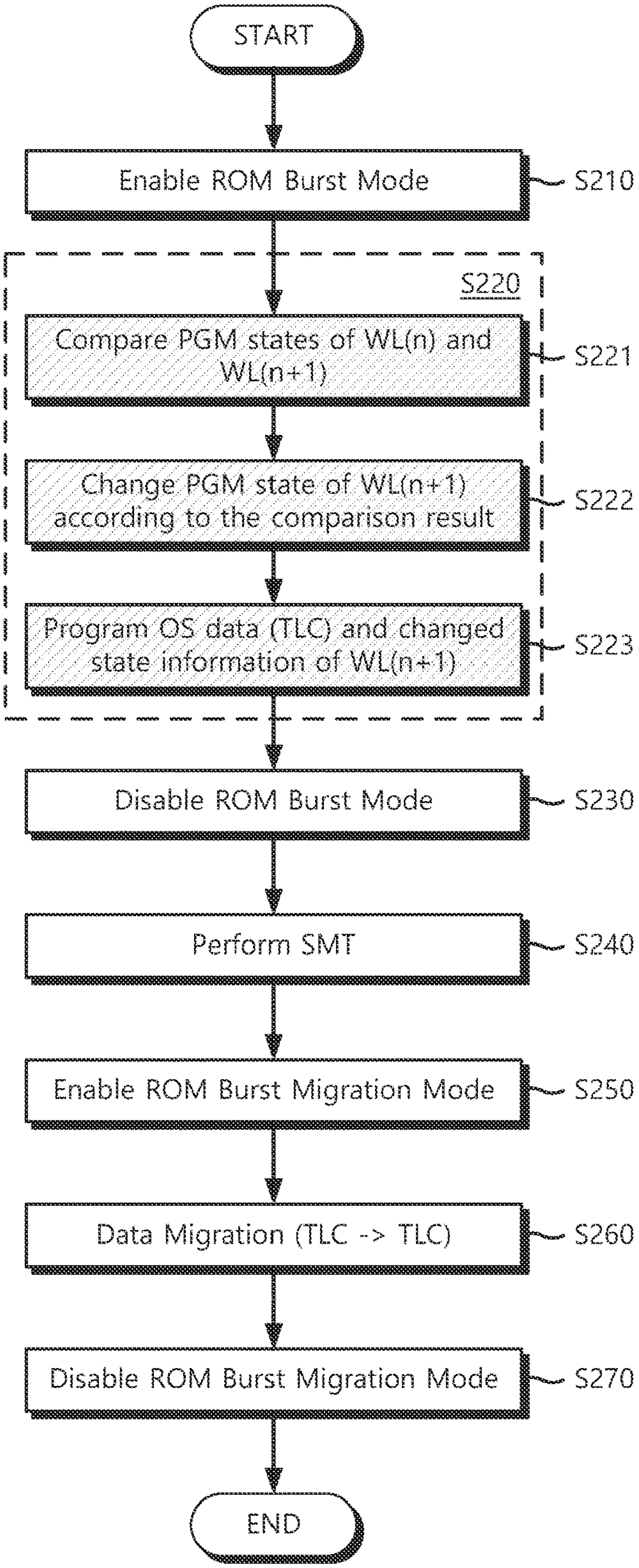
FIG. 10 is a flowchart illustrating an SMT operation method according to an embodiment.
Figure 11:
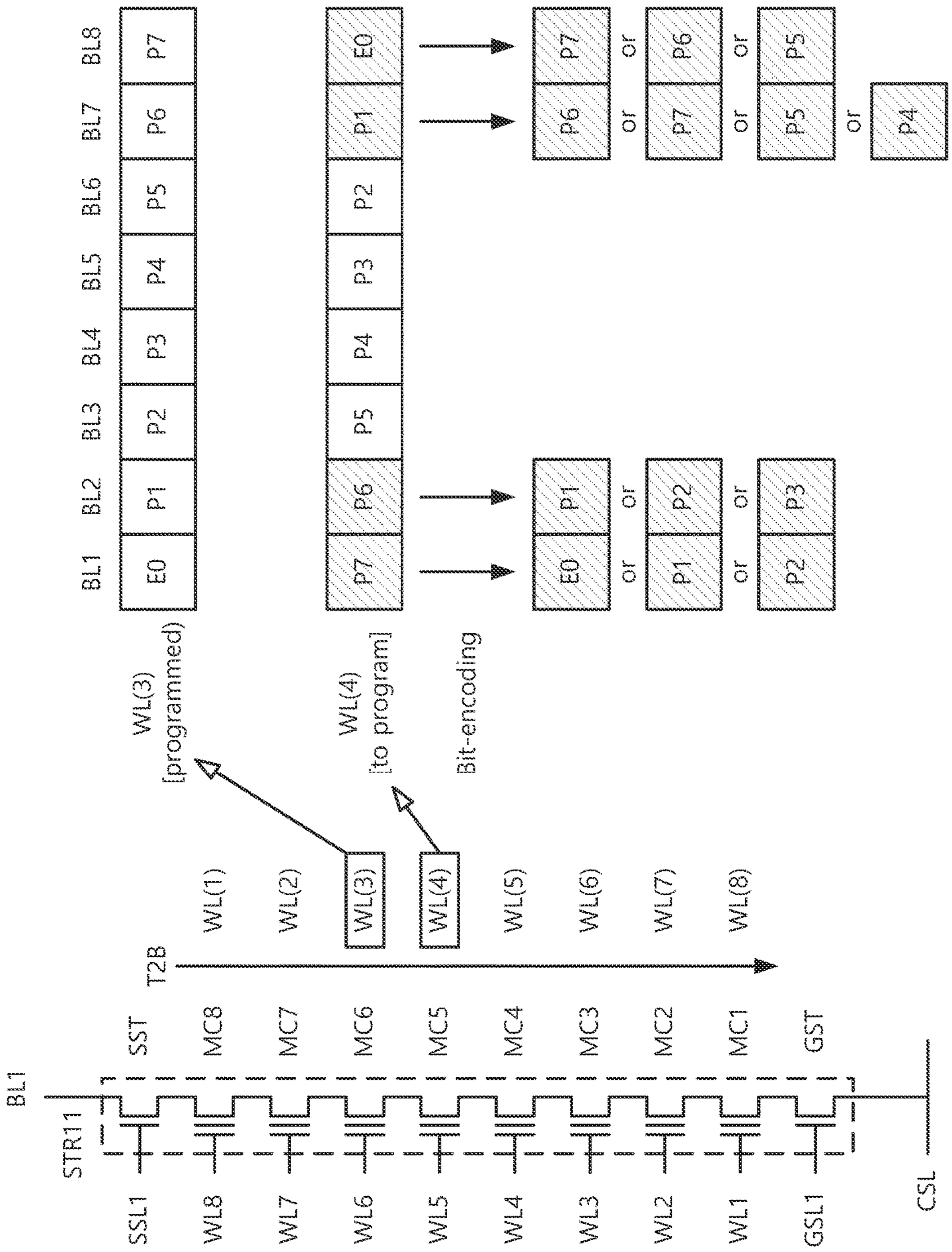
FIG. 11 is a diagram for explaining operation S220 illustrated in FIG. 10

FIG. 10 is a flowchart illustrating an SMT operation method according to an embodiment. FIG. 11 is a diagram for explaining operation S220 illustrated in FIG. 10. The SMT operation method of FIG. 10 may compare program states of two adjacent word lines in a memory block and change a state index so that a difference of more than a specific state does not occur.

The SMT operation method of FIG. 10 changes the state index before and after the SMT process, thereby reducing the effects of word line interference and lateral charge loss of adjacent memory cells during the SMT process. The present disclosure may reduce the error bit occurrence probability according to the SMT process by reducing the effects of word line interference and lateral charge loss of adjacent memory cells.

Referring to FIG. 10, the memory controller 1200 may enable the ROM burst mode (S210). After the ROM burst mode is enabled, a state change operation may be performed (S220). OS data may be TLC programmed during state change operation.

In operation S221, the memory controller 1200 may compare the program state of WL(n) programmed in the flash memory 1100 with the program state of WL(n+1) to be programmed. WL(n) is the n-th programmed word line, and WL(n+1) is the (n+1)-th programmed word line. That is, WL(n+1) is programmed after WL(n).

Referring to FIG. 11, the flash memory 1100 may perform a program operation from the eighth word line WL8 to the first word line WL1 in a top to bottom (T2B) method. The eighth word line WL8 may be programmed first. The first word line to be programmed is marked WL(1). The third programmed word line is indicated by WL(3), and the fourth word line to be programmed is indicated by WL(4). That is, WL(3) is a word line already programmed in the flash memory 1100, and WL(4) is a word line to be programmed immediately in the flash memory 1100.

For example, the memory cells connected to the WL(3) and the first to eighth bit lines BL1 to BL8 are programmed to states E0, P1, P2, . . . , P7, respectively. Assume that the memory cells connected to the WL(4) and the first to eighth bit lines BL1 to BL8 are to be programmed to states P7, P6, P5, . . . , P1, and E0, respectively. The memory controller 1200 may compare program states of the WL(3) programmed in the flash memory 1100 with program states of the WL(4) to be programmed.

For example, the memory controller 1200 may compare state index of WL(3) and WL(4). Memory cells in states E0 and P7 are respectively connected to the first bit line BL1, and the state index may be 0 and 7, respectively. Memory cells in states P1 and P6 are respectively connected to the second bit line BL2, and the state index may be 1 and 6, respectively. Memory cells in states P2 and P5 are respectively connected to the third bit line BL3, and the state index may be 2 and 5, respectively. Similarly, memory cells in P7 and E0 states are connected to the eighth bit line BL8, respectively, and the state index may be 7 and 0, respectively.

In operation S222, the memory controller 1200 may change the program state of the WL(n+1) according to the comparison result in operation S221. For example, if the state index difference is greater than a reference value A, the program state of the WL(n+1) may be changed to be less than or equal to the reference value A. For example, the reference value A may be 3. Referring to FIG. 11, if the state index difference of the WL(3) and the WL(4) is greater than the reference value A (i.e., greater than 3), the program state of the word line WL(4) may be changed so that the state index difference of the WL(3) and the WL(4) is less than or equal to the reference value A. The memory controller 1200 may change the state of the word line WL(4) through bit-encoding.

Because the state index difference of memory cells connected to the first bit line BL1 is 7, the memory controller 1200 may change the program state P7 of the word line WL(4) to one of E0, P1, and P2. That is, the state index difference may be changed to be less than 3. Because the state index difference of the memory cells connected to the second bit line BL2 is 5, (which is greater than 3) the memory controller 1200 may change the program state P6 of the word line WL(4) to one of P1, P2, and P3.

Because the state index difference of memory cells connected to the third bit line BL3 is 3, the memory controller 1200 does not change the program state P5 of the word line WL(4). Similarly, because the state index difference of memory cells connected to the eighth bit line BL8 is 7, the memory controller 1200 may change the erase state E0 of the word line WL(4) to one of P7, P6, and P5.

In operation S223, the memory controller 1200 may program OS data and changed state information of WL(n+1) to the flash memory 1100. The flash memory 1100 may TLC program OS data. The flash memory 1100 may store OS data in a main field and store changed state information in a spare field. Referring to FIG. 11, the flash memory 1100 may program memory cells connected to word line WL(4) into states E0, P1, P5, P4, P3, P2, P6, and P7, respectively.

After programming the OS data, the memory controller 1200 may disable the ROM burst mode (S230). After the ROM burst mode is completed, an SMT process may be performed (S240). Because threshold voltages of the flash memory cells may change while passing through the SMT process line, the probability of generating error bits may increase.

The memory controller 1200 may enable the ROM burst migration mode after the SMT process (S250). The ROM burst migration mode is a program mode for restoring OS data to its original state after the flash memory 1100 performs an SMT process.

After the ROM burst migration mode is enabled, the memory controller 1200 may perform a data migration operation (S260). The migration operation may refer to an operation of restoring a state index to an original state. For example, the flash memory 1100 may restore the threshold voltage distribution changed due to the state change operation (S220) to an original state through a data migration operation. After performing the data migration operation, the memory controller 1200 may disable the ROM burst migration mode (S270).

The SMT operation method of FIG. 10 may compare program states of two adjacent word lines in a memory block and change a state index so that state differences do not exceed a certain number. The SMT operation method of FIG. 10 changes the state index before and after the SMT process, thereby reducing the effects of word line interference and lateral charge loss of adjacent memory cells during the SMT process.

The SMT operation method of FIG. 10 may reduce word line interference of adjacent memory cells during the SMT process. Because adjacent memory cells are less affected by adjacent word lines, the flash memory 1100 may reduce the effect of lateral charge loss. The present disclosure may reduce the probability of occurrence of error bits according to the SMT process by reducing the effects of word line interference and lateral charge loss of adjacent memory cells.

Figure 12:
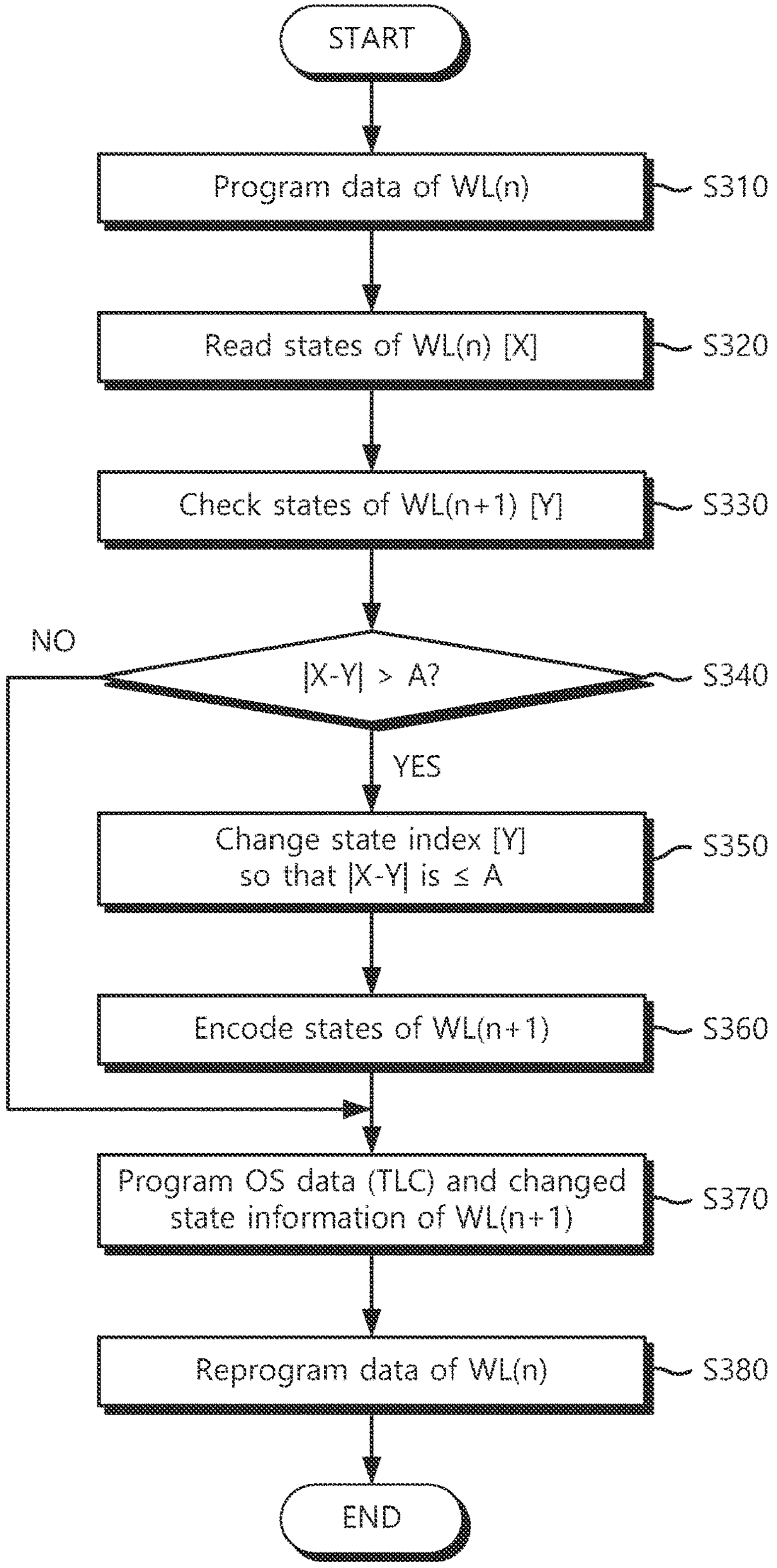
FIG. 12 is a flowchart illustrating an embodiment of the state change operation illustrated in FIG. 10.

FIG. 12 is a flowchart illustrating an embodiment of the state change operation illustrated in FIG. 10. Referring to FIGS. 11 and 12, an SMT operation method of a storage device 1000 according to an embodiment will be described.

In operation S310, the memory controller 1200 may program data of the word line WL(n). The flash memory 1100 may TLC program data of the word line WL(n). Referring to FIG. 11, the flash memory 1100 may program memory cells connected to the word line WL(3) to have any one of E0-P7 program states.

In operation S320, the memory controller 1200 may read states of the word line WL(n+1) before programming data in the word line WL(n+1). Referring to FIG. 11, the memory controller 1200 may read the states of the word line WL(3) before programming data in the word line WL(4). Program states of memory cells connected to the word line WL(3) may be E0, P1, P2, . . . , P7, respectively, and state indexes [X] may be 0, 1, 2, . . . , 7, respectively.

In operation S330, the memory controller 1200 may check states of data to be programmed into the word line WL(n+1). Referring to FIG. 11, the states of data to be programmed into the word line WL(4) are P7, P6, P5, . . . , E0, respectively, and state indexes [Y] may be 7, 6, 5, . . . , 0, respectively.

In operation S340, the memory controller 1200 may compare the program states of the word line WL(n) and the word line WL(n+1). The memory controller 1200 may determine whether a difference between state indexes of the word line WL(n) and the word line WL(n+1) is greater than a reference value A. In the case of the TLC program, the reference value A may be any one of natural numbers from 1 to 6. In the case of a quad-level cell (QLC) programmed data, in which 4-bit data may be stored in one memory cell, the reference value A may be any one of natural numbers from 1 to 15.

Referring to FIG. 11, the memory controller 1200 may determine whether a difference between state indexes of the word line WL(3) and the word line WL(4) is greater than 3. As shown in FIG. 11, the difference in state indexes of the shaded memory cells of the word line WL(4) is greater than 3. If the state index difference |X−Y| is greater than the reference value A (YES), operation S350 may be performed, and if not greater than A (NO), operation S370 may be performed without performing operations S350 and S360.

In operation S350, the memory controller 1200 may change the state index [Y] of the word line WL(n+1) according to the comparison result in operation S340. For example, if the state index difference is greater than A, the state index [Y] of the word line WL(n+1) may be changed so that the state index difference is less than or equal to A. Referring to FIG. 11, if the difference between the state index of the word line WL(3) and the word line WL(4) is greater than 3, the state index of the word line WL(4) may be changed so that the state index difference is less than or equal to 3.

In operation S360, the memory controller 1200 may encode the program state of the word line WL(n+1). Referring to FIG. 11, the memory controller 1200 may change the program state P7 of the word line WL(4) to any one of E0, P1, and P2 through bit-encoding. The program state P6 may be changed to have any one of P1, P2, and P3, each of which is within the reference value A of the word line WL(3). The memory controller 1200 may change the program state P1 of the word line WL(4) to one of P6, P7, P5, and P4 through bit-encoding. The erase state E0 may be changed to have any one of P7, P6, and P5.

In operation S370, the memory controller 1200 may program OS data and changed state information of WL(n+1) into the flash memory 1100. The flash memory 1100 may TLC program OS data. OS data may be stored in a main field of the flash memory 1100 and changed state information may be stored in a spare field.

Referring to FIG. 11, the flash memory 1100 may program memory cells connected to the word line WL(4) to states (E0, P1, P5, P4, P3, P2, P6, and P7). Alternatively, the flash memory 1100 may program memory cells connected to the word line WL(4) to, for example, states (P1, P2, P5, P4, P3, P2, P7, P6) or states (P2, P3, P5, P4, P3, P2, P5, P5).

In operation S380, the memory controller 1200 may reprogram data of the word line WL(n). The flash memory 1100 may have sufficient read margin by reprogramming the data of the word line WL(n).

The SMT operation method of FIG. 12 may change the state so that the difference between the state indexes of adjacent word lines is not larger than the reference value A. The SMT operation method of FIG. 12 may reduce the effects of word line interference and lateral charge loss of adjacent memory cells during the SMT process by changing the state index.

Figure 13:
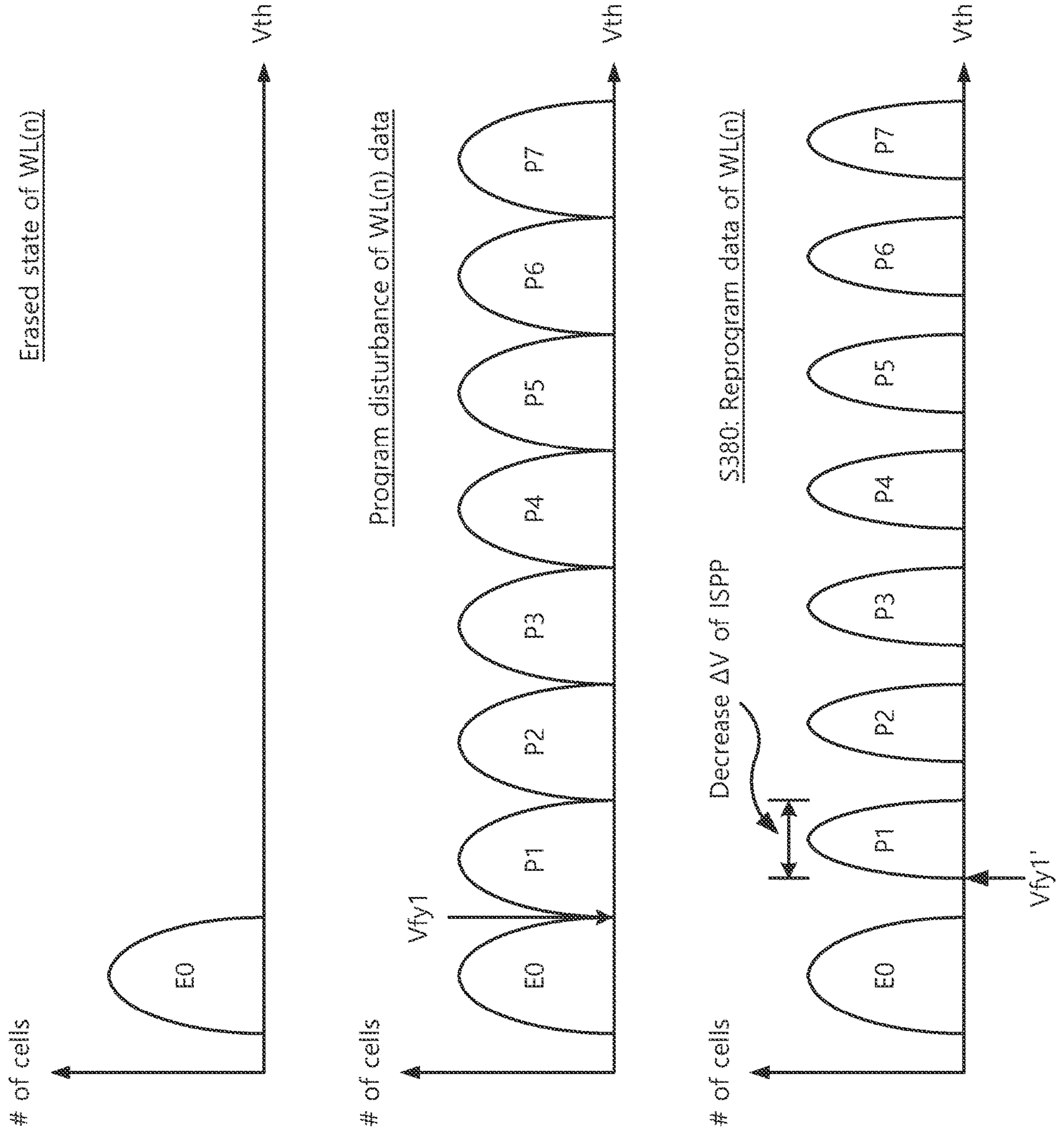
FIG. 13 is a graph illustrating changes in program states of a word line in the SMT operation method of FIG. 12.

FIG. 13 is a graph illustrating changes in program states of word line WL(n) s in the SMT operation method of FIG. 12. Referring to the upper portion of FIG. 13, the word line WL(n) is initially in an erase state E0. As shown in the middle portion of FIG. 13, as the program operation progresses, the threshold voltage distribution of the data of the word line WL(n) may change undesirably due to effects such as program disturbance. A read margin may not be sufficiently secured due to distortion of the threshold voltage distribution.

The flash memory 1100 may reduce the error bit probability due to distortion of the threshold voltage distribution by reprogramming the word line WL(n) as illustrating in operation S380 of FIG. 12. The reprogramming operation of word line WL(n) may be performed by increasing the program verify voltage from Vfy1 to Vfy1' and reducing the step voltage increment width of the incremental step pulse voltage (ISPP), which may result in the threshold voltage distribution shown in the lower portion of FIG. 13. Although FIG. 13 illustrates the case of the first program state P1 as an example, a reprogramming operation may be performed similarly to the other program states. The flash memory 1100 may sufficiently secure a read margin by reprogramming the data of the word line WL(n).

Figure 14:
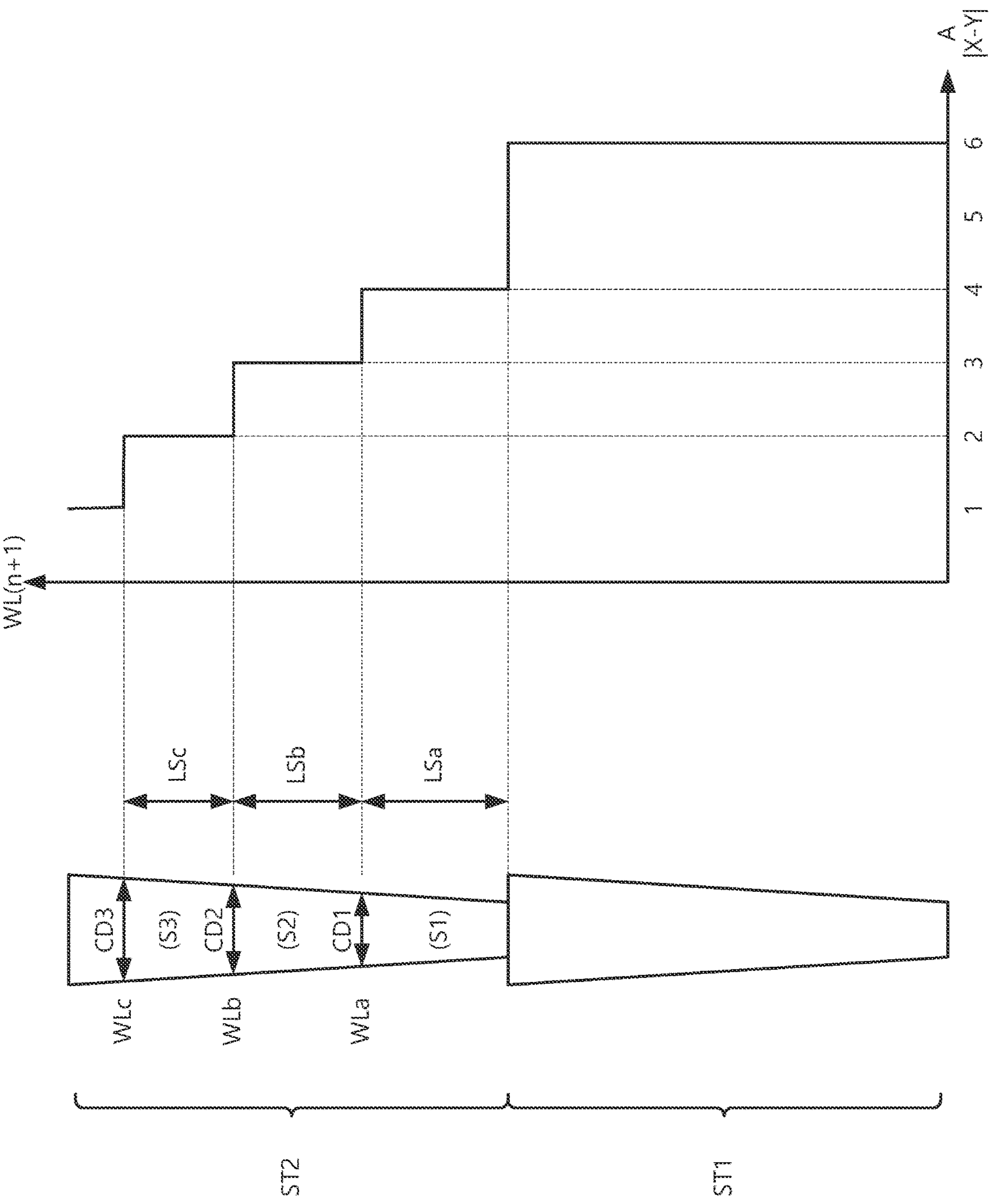
FIG. 14 is a graph illustrating that a reference value for determining a state index difference may be changed according to a position of a word line.

FIG. 14 is a graph illustrating that a reference value for determining a state index difference may be changed according to a position of a word line. Referring to FIG. 14, a pillar of a memory cell array (refer to FIG. 4, 1110) may be formed by bonding first and second stacks ST1 and ST2. The first stack ST1 may be located in the lower part, and the second stack ST2 may be located in the upper part.

The upper second stack may be divided into a plurality of regions (S1, S2, S3, etc.) according to a channel diameter CD. The region S1 is a region in which the channel diameter CD is smaller than the first channel diameter CD1. The region S2 is a region in which the channel diameter CD is greater than the first channel diameter CD1 and smaller than the second channel diameter CD2. The region S3 is a region in which the channel diameter CD is smaller than the third channel diameter CD3.

The area of the second stack ST2 may be divided according to the height of the word line. The S1 region is a region lower than WLa. The S2 region is a region higher than WLa and lower than WLb. And the S3 region is a region lower than WLc. Also, the area of the second stack ST2 may be divided according to the spacing between word lines. The spacing LS between word lines may decrease as the position of the word lines increases. For example, as for the spacing LS between word lines, LSa may be greater than LSb and LSb may be greater than LSc in the second stack S2.

Program performance may be improved by lowering the reference value A in an area where the spacing between word lines is narrow. Referring to the example of FIG. 14, when the position of WL(n+1) is in the first stack ST1, the reference value A may be 6. The reference value A may be 4 when the position of WL(n+1) is in the S1 region of the second stack ST2. The reference value A may be 3 if it is in the S2 region and may be 2 if it is in the S3 region.

Figure 15:
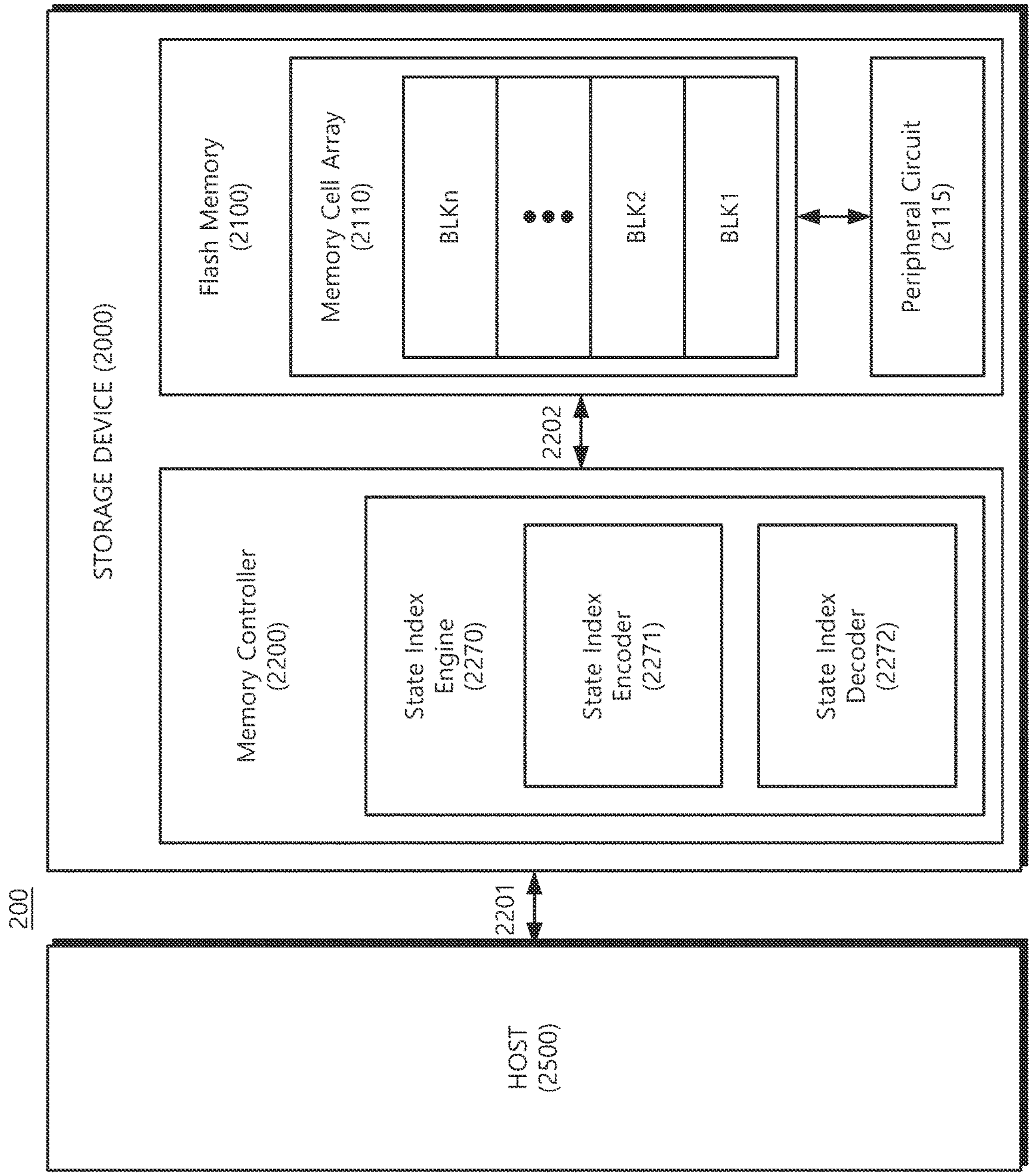
FIG. 15 is a block diagram illustrating a memory system according to an embodiment.

FIG. 15 is a block diagram illustrating a memory system according to an embodiment. Referring to FIG. 14, a memory system 200 includes a storage device 2000 and a host 2500. The storage device 2000 may be connected to the host 2500 through a host interface 2201.

The storage device 2000 may include a non-volatile memory. For example, the storage device 2000 may be a flash storage device based on the flash memory 2100. The storage device 2000 may include a flash memory 2100 and a memory controller 2200.

The flash memory 1100 may be connected to the memory controller 2200 through a flash interface 2202. The flash memory 2100 may include a memory cell array 2110 and a peripheral circuit 2115. The memory cell array 2110 may include a plurality of memory blocks BLK1 to BLKn.

The memory controller 2200 may identify a reference value that varies based on which word line is being accessed. For example, the memory controller 2200 may identify the reference values based table a chart corresponding to the graph of FIG. 14. The memory controller 2200 may include a state index engine 2270 that performs state index changes of data. The state index engine 2270 may include a state index encoder 2271 and a state index decoder 2272.

The state index encoder 2271 may compare program states of two adjacent word lines in a memory block and change a state index such that state differences do not occur more than a certain number. The state index encoder 2271 may change the state index before the SMT process, thereby reducing the effects of word line interference of adjacent memory cells and lateral charge loss during the SMT process. The state index encoder 2271 may reduce the error bit generation probability due to the SMT process by reducing the effect of word line interference and lateral charge loss of adjacent memory cells.

The state index decoder 2272 may receive encoded data from the flash memory 2100 after the SMT process and restore original data. The present disclosure may reduce the error bit generation probability according to the SMT process by reducing the effect of word line interference and lateral charge loss of adjacent memory cells by using the state index encoder 2271 and the state index decoder 2272.

Figure 16:
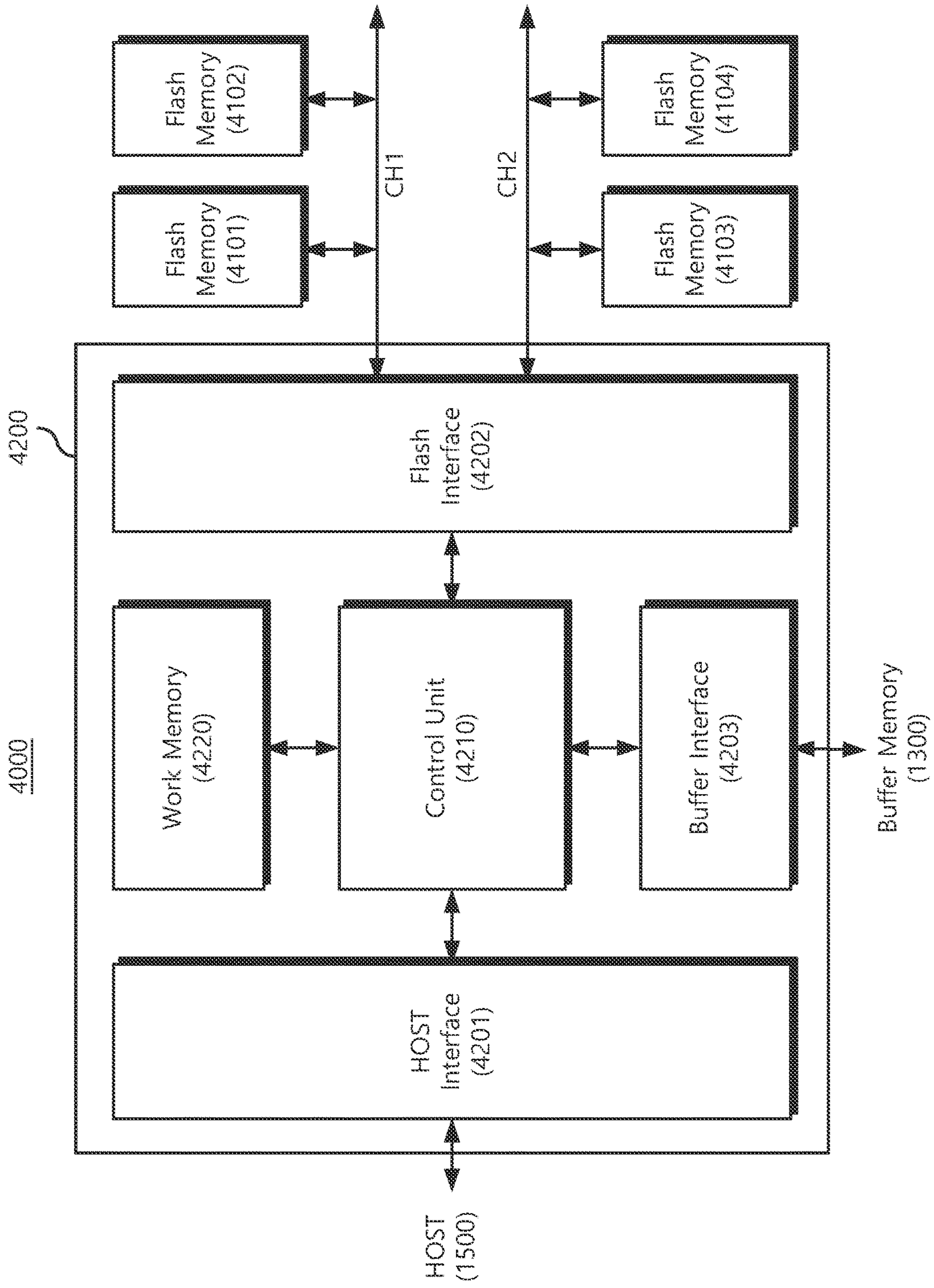
FIG. 16 is a block diagram illustrating a solid state drive according to an embodiment.

FIG. 16 is a block diagram illustrating an example in which a storage device according to an embodiment is implemented with a solid state drive (SSD). Referring to FIG. 16, an SSD 4000 may include a plurality of flash memories 4101 to 4104 and an SSD controller 4200.

The first and second flash memories 4101 and 4102 may be connected with the SSD controller 4200 through a first channel CH1. The third and fourth flash memories 4103 and 4104 may be connected with the SSD controller 4200 through a second channel CH2. The number of channels connected with the SSD controller 4200 may be 2 or more. The number of flash memories connected with one channel may be 2 or more.

The SSD controller 4200 may include a host interface 4201, a flash interface 4202, a buffer interface 4203, a control unit 4210, and a work memory 4220. The SSD controller 4200 may be connected with a host 1500 through the host interface 4201. Depending on a request of the host 1500, the SSD controller 4200 may write data in the corresponding flash memory or may read data from the corresponding flash memory.

The SSD controller 4200 may be connected with the plurality of flash memories 4101 to 4104 through the flash interface 4202 and may be connected with a buffer memory 1300 through the buffer interface 4203. The flash interface 4202 may provide data, which are temporarily stored in the buffer memory 1300, to the flash memories through the channels CH1 and CH2. The flash interface 4202 may transfer the data read from the flash memories 4101 to 4104 to the buffer memory 1300.

The control unit 4210 may analyze and process the signal received from the host 1500. The control unit 4210 may control the host 1500 or the flash memories 4101 to 4104 through the host interface 4201 or the flash interface 4202. The control unit 4210 may control operations of the flash memories 4101 to 4104 by using firmware for driving the SSD 4000.

The SSD controller 4200 may manage data to be stored in the flash memories 4101 to 4104. In the sudden power-off event, the SSD controller 4200 may back the data stored in the work memory 4220 or the buffer memory 1300 up to the flash memories 4101 to 4104.

Figure 17:
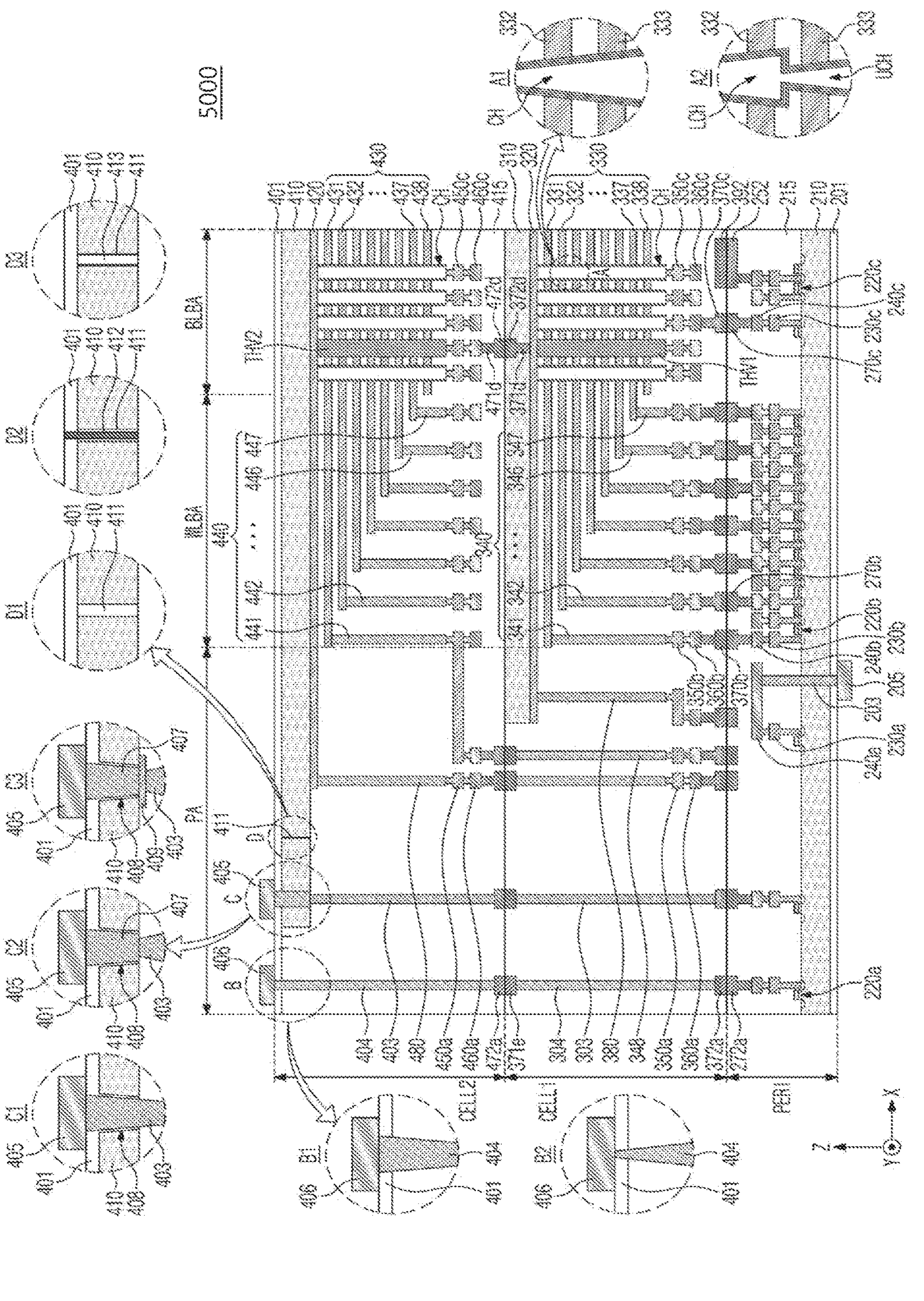
FIG. 17 is a view illustrating a memory device according to some embodiments.

FIG. 17 is a view illustrating a memory device 5000 according to some embodiments.

Referring to FIG. 17, the memory device 5000 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 5000 may include the at least one upper chip including the cell region. For example, the memory device 5000 may include two upper chips. However, the number of the upper chips is not limited thereto. In the case in which the memory device 5000 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 5000. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In this regard, an upper portion of the lower chip may mean an upper portion defined based on a +Z-axis direction, and the upper portion of each of the first and second upper chips may mean an upper portion defined based on a −Z-axis direction. However, embodiments of the inventive concepts are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 5000 may include an external pad bonding region PA, a word line bonding region WLBA, and a bit line bonding region BLBA.

The peripheral circuit region PERI may include a first substrate 210 and a plurality of circuit elements 220*a*, 220*b* and 220*c* formed on the first substrate 210. An interlayer insulating layer 215 including one or more insulating layers may be provided on the plurality of circuit elements 220*a*, 220*b* and 220*c*, and a plurality of metal lines electrically connected to the plurality of circuit elements 220*a*, 220*b* and 220*c* may be provided in the interlayer insulating layer 215. For example, the plurality of metal lines may include first metal lines 230*a*, 230*b* and 230*c* connected to the plurality of circuit elements 220*a*, 220*b* and 220*c*, and second metal lines 240*a*, 240*b* and 240*c* formed on the first metal lines 230*a*, 230*b* and 230*c*. The plurality of metal lines may be formed of at least one of various conductive materials. For example, the first metal lines 230*a*, 230*b* and 230*c* may be formed of tungsten having a relatively high electrical resistivity, and the second metal lines 240*a*, 240*b* and 240*c* may be formed of copper having a relatively low electrical resistivity.

The first metal lines 230*a*, 230*b* and 230*c* and the second metal lines 240*a*, 240*b* and 240*c* are illustrated and described. However, embodiments of the inventive concepts are not limited thereto. In certain embodiments, at least one or more additional metal lines may further be formed on the second metal lines 240*a*, 240*b* and 240*c*. In this case, the second metal lines 240*a*, 240*b* and 240*c* may be formed of aluminum, and at least some of the additional metal lines formed on the second metal lines 240*a*, 240*b* and 240*c* may be formed of copper having an electrical resistivity lower than that of aluminum of the second metal lines 240*a*, 240*b* and 240*c*.

The interlayer insulating layer 215 may be disposed on the first substrate 210 and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (i.e., the Z-axis direction) perpendicular to a top surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked on the third substrate 410 in a direction (i.e., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350*c* and a second metal line 360*c* in the bit line bonding region BLBA. For example, the second metal line 360*c* may be a bit line and may be connected to the channel structure CH through the first metal line 350*c*. The bit line 360*c* may extend in a first direction (e.g., a Y-axis direction) parallel to the top surface of the second substrate 310.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350*c* and the second metal line 360*c*. As a length of a channel increases, due to characteristics of manufacturing processes, it may be difficult to form a channel having a substantially uniform width. The memory device 5000 according to embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a word line. A level of a voltage applied to the dummy word line may be different from a level of a voltage applied to the word line, and thus it is possible to reduce an influence of a non-uniform channel width between the lower and upper channels LCH and UCH on an operation of the memory device.

The number of the lower word lines 331 and 332 penetrated by the lower channel LCH is less than the number of the upper word lines 333 to 338 penetrated by the upper channel UCH in the region 'A2'. However, embodiments of the inventive concepts are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. The first through-electrode THV1 may penetrate the common source line 320 and the plurality of word lines 330. In certain embodiments, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 372*d* and a second through-metal pattern 472*d*. The first through-metal pattern 372*d* may be formed at a bottom end of the first upper chip including the first cell region CELL1, and the second through-metal pattern 472*d* may be formed at a top end of the second upper chip including the second cell region CELL2. The first through-electrode THV1 may be electrically connected to the first metal line 350*c* and the second metal line 360*c*. A lower via 371*d* may be formed between the first through-electrode THV1 and the first through-metal pattern 372*d*, and an upper via 471*d* may be formed between the second through-electrode THV2 and the second through-metal pattern 472*d*. The first through-metal pattern 372*d* and the second through-metal pattern 472*d* may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360*c* may be electrically connected to a page buffer included in the peripheral circuit region PERI. For example, some of the circuit elements 220*c* of the peripheral circuit region PERI may constitute the page buffer, and the bit line 360*c* may be electrically connected to the circuit elements 220*c* constituting the page buffer through an upper bonding metal pattern 370*c* of the first cell region CELL1 and an upper bonding metal pattern 270*c* of the peripheral circuit region PERI.

In the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (341 to 347). First metal lines 350*b* and second metal lines 360*b* may be sequentially connected onto the cell contact plugs 340 connected to the word lines 330. In the word line bonding region WLBA, the cell contact plugs 340 may be connected to the peripheral circuit region PERI through upper bonding metal patterns 370*b* of the first cell region CELL1 and upper bonding metal patterns 270*b* of the peripheral circuit region PERI.

The cell contact plugs 340 may be electrically connected to a row decoder included in the peripheral circuit region PERI. For example, some of the circuit elements 220*b* of the peripheral circuit region PERI may constitute the row decoder, and the cell contact plugs 340 may be electrically connected to the circuit elements 220*b* constituting the row decoder through the upper bonding metal patterns 370*b* of the first cell region CELL1 and the upper bonding metal patterns 270*b* of the peripheral circuit region PERI. In some embodiments, an operating voltage of the circuit elements 220*b* constituting the row decoder may be different from an operating voltage of the circuit elements 220*c* constituting the page buffer. For example, the operating voltage of the circuit elements 220*c* constituting the page buffer may be greater than the operating voltage of the circuit elements 220*b* constituting the row decoder.

Likewise, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370*b* may be formed in the first cell region CELL1, and the upper bonding metal patterns 270*b* may be formed in the peripheral circuit region PERI. The upper bonding metal patterns 370*b* of the first cell region CELL1 and the upper bonding metal patterns 270*b* of the peripheral circuit region PERI may be electrically connected to each other by the bonding method. The upper bonding metal patterns 370*b* and the upper bonding metal patterns 270*b* may be formed of aluminum, copper, or tungsten.

In the external pad bonding region PA, a lower metal pattern 371*e* may be formed in a lower portion of the first cell region CELL1, and an upper metal pattern 472*a* may be formed in an upper portion of the second cell region CELL2. The lower metal pattern 371*e* of the first cell region CELL1 and the upper metal pattern 472*a* of the second cell region CELL2 may be connected to each other by the bonding method in the external pad bonding region PA. Likewise, an upper metal pattern 372*a* may be formed in an upper portion of the first cell region CELL1, and an upper metal pattern 272*a* may be formed in an upper portion of the peripheral circuit region PERI. The upper metal pattern 372*a* of the first cell region CELL1 and the upper metal pattern 272*a* of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350*a* and a second metal line 360*a* may be sequentially stacked on the common source line contact plug 380 of the first cell region CELL1, and a first metal line 450*a* and a second metal line 460*a* may be sequentially stacked on the common source line contact plug 480 of the second cell region CELL2.

Input/output pads 205, 405 and 406 may be disposed in the external pad bonding region PA. A lower insulating layer 201 may cover a bottom surface of the first substrate 210, and a first input/output pad 205 may be formed on the lower insulating layer 201. The first input/output pad 205 may be connected to at least one of a plurality of the circuit elements 220*a* disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 to electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220*a* disposed in the peripheral circuit region PERI through second input/output contact plugs 403 and 303, and the third input/output pad 406 may be connected to at least one of the plurality of circuit elements 220*a* disposed in the peripheral circuit region PERI through third input/output contact plugs 404 and 304.

In some embodiments, the third substrate 410 may not be disposed in a region in which the input/output contact plug is disposed. For example, as illustrated in a region 'B', the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In some embodiments, as illustrated in a region 'B1', the third input/output contact plug 404 may extend in a third direction (e.g., the Z-axis direction), and a diameter of the third input/output contact plug 404 may become progressively greater toward the upper insulating layer 401. In this regard, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In certain embodiments, as illustrated in a region 'B2', the third input/output contact plug 404 may extend in the third direction (e.g., the Z-axis direction), and a diameter of the third input/output contact plug 404 may become progressively less toward the upper insulating layer 401. In this regard, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In certain embodiments, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In some embodiments, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments of the inventive concepts are not limited thereto, and in certain embodiments, the diameter of the second input/output contact plug 403 may become progressively less toward the second input/output pad 405.

In certain embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In certain embodiments illustrated in a region 'C3', a stopper 409 may further be formed on a bottom end of the opening 408 of the third substrate 410, as compared with the embodiments of the region 'C2'. The stopper 409 may be a metal line formed in the same layer as the common source line 420. Alternatively, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371*e* or may become progressively greater toward the lower metal pattern 371*e*.

In some embodiments, a slit 411 may be formed in the third substrate 410. For example, the slit 411 may be formed at a certain position of the external pad bonding region PA. For example, as illustrated in a region 'D', the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In some embodiments, as illustrated in a region 'D1', the slit 411 may be formed to penetrate the third substrate 410. For example, the slit 411 may be used to prevent the third substrate 410 from being finely cracked when the opening 408 is formed. However, embodiments of the inventive concepts are not limited thereto, and in certain embodiments, the slit 411 may be formed to have a depth ranging from about 60% to about 70% of a thickness of the third substrate 410.

In certain embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In certain embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Because the insulating material 413 is formed in the slit 411, it is possible to prevent a voltage provided through the second input/output pad 405 from affecting a metal layer disposed on the third substrate 410 in the word line bonding region WLBA.

In certain embodiments, the first to third input/output pads 205, 405 and 406 may be selectively formed. For example, the memory device 5000 may be realized to include only the first input/output pad 205 disposed on the first substrate 210, to include only the second input/output pad 405 disposed on the third substrate 410, or to include only the third input/output pad 406 disposed on the upper insulating layer 401.

In some embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Likewise, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

According to the present disclosure, the flash memory may reduce the probability of occurrence of bit errors due to high-temperature deterioration of the SMT process.

In some embodiments, each of the components represented by a block, such as those illustrated in FIGS. 1, 2, 15 and 16, may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing operations may employ any number of related art techniques for electronics configuration, signal processing and/or control, data processing and the like.

While aspects of embodiments have been described with reference to the drawings, it will be apparent to those of ordinary skill in the art that various changes and modifications may be made thereto without departing from the spirit and scope of the following claims.

What is claimed is:

1. A method of operating a storage device for programming data into a flash memory before exposing to a high-temperature environment process, the method comprising:

comparing program states of first memory cells connected to a first word line with program states to be programmed to second memory cells connected to a second word line;

changing the program states to be programmed to the second memory cells according to a result of the comparing; and multi-bit programming the changed program states and/or changed state information into the second memory cells, wherein the comparing comprises comparing a difference value with a reference value, the difference value indicating a difference between the program states of the first memory cells and the program states to be programmed to the second memory cells, and the reference value being a natural number.

2. The method of claim 1, wherein the second word line is adjacent to the first word line.

3. The method of claim 1, wherein the reference value varies according to a position of the second word line.

4. The method of claim 1, further comprising identifying the reference value according to a spacing between the first word line and the second word line.

5. The method of claim 1, wherein the changing the program states comprises changing state indexes of the second memory cells.

6. The method of claim 1, wherein the changed program states are stored in a main field of the second memory cells, and the changed state information is stored in a spare field.

7. The method of claim 1, wherein the multi-bit programming is a triple-level cell (TLC) program operation that stores 3-bits in one memory cell.

8. The method of claim 1, further comprising performing a data migration operation to restore the program states of the second memory cells after the high-temperature environment process.

9. The method of claim 1, wherein memory cells of the flash memory are stacked in a vertical direction from a substrate.

10. A method of operating a storage device for programming data into a flash memory before exposing to a high-temperature environment process, comprising:

programming first memory cells connected to a first word line;

reading first program states of the first memory cells;

checking second program states to be programmed to second memory cells connected to a second word line;

comparing the first program states with the second program states;

changing the second program states according to a result of the comparing; and multi-bit programming the changed second program states and/or changed state information into the second memory cells, wherein the comparing comprises comparing a difference value with a reference value, the difference value indicating a difference between the first program states of the first memory cells and the second program states to be programmed to the second memory cells, and the reference value being a natural number.

11. The method of claim 10, wherein the second word line is adjacent to the first word line.

12. The method of claim 10, further comprising identifying the reference value according to a position of the second word line.

13. The method of claim 10, further comprising identifying the reference value according to a spacing between the first word line and the second word line.

14. A storage device comprising:

a flash memory comprising first memory cells connected to a first word line and second memory cells connected to a second word line; and a memory controller configured to:

compare program states of the first memory cells with program states to be programmed to the second memory cells, change the program states to be programmed to the second memory cells according to a comparison result, and multi-bit program the changed program states and/or changed state information into the second memory cells; and control a state index encoder to perform bit-encoding according to a result of a comparing a difference value with a reference value, the difference value indicating a difference between the program states of the first memory cells and the program states to be programmed to the second memory cells, and the reference value being a natural number.

15. The storage device of claim 14, wherein the memory controller is further configured to control:

the state index encoder to change the program states of the second memory cells before exposing to a high-temperature environment process; and a state index decoder to restore the program states of the second memory cells after the high-temperature environment process.

16. The storage device of claim 15, wherein the memory controller is further configured to control the state index encoder to perform bit-encoding by changing state indexes of the second memory cells.

17. The storage device of claim 14, wherein the second word line is positioned between the first word line and a common source line.

* * * * *